(12) United States Patent
Asai

(10) Patent No.: US 10,182,165 B2
(45) Date of Patent: Jan. 15, 2019

(54) NON-TRANSITORY COMPUTER READABLE STORAGE MEDIUM STORING PROGRAM, AND TERMINAL APPARATUS ACCEPTING TRIGGER OPERATION FOR EXTERNAL APPLICATION

(71) Applicant: BROTHER KOGYO KABUSHIKI KAISHA, Nagoya-shi, Aichi-ken (JP)

(72) Inventor: Norihiko Asai, Tajimi (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 15/840,729

(22) Filed: Dec. 13, 2017

(65) Prior Publication Data
US 2018/0167523 A1 Jun. 14, 2018

(30) Foreign Application Priority Data
Dec. 13, 2016 (JP) ................................ 2016-240812

(51) Int. Cl.
*G06F 3/12* (2006.01)
*H04N 1/00* (2006.01)
(Continued)

(52) U.S. Cl.
CPC ....... *H04N 1/00244* (2013.01); *G06F 3/0481* (2013.01); *G06F 3/0484* (2013.01); *G06F 3/0488* (2013.01); *G06F 3/04842* (2013.01); *G06F 9/445* (2013.01); *H04N 1/00* (2013.01); *H04N 2201/0094* (2013.01)

(58) Field of Classification Search
None
See application file for complete search history.

(56) References Cited

U.S. PATENT DOCUMENTS 7,383,328 B2 * 6/2008 Iyoki .................. H04N 1/00204
358/505
9,948,761 B2 * 4/2018 Asai ........................ B41J 3/445
(Continued)

FOREIGN PATENT DOCUMENTS

JP 2008-187575 A 8/2008
JP 2012-203742 A 10/2012

*Primary Examiner* — Dung D Tran
(74) *Attorney, Agent, or Firm* — Merchant & Gould P.C.

(57) ABSTRACT

A terminal apparatus stores an external program and operation information associated with each other. The external program causes an image processing apparatus to perform an image processing operation. The operation information indicates a trigger operation which is acceptable via the input interface. The terminal apparatus performs: accepting, a user operation for specifying operation specification information that defines details of the image processing operation that is to be performed by the image processing apparatus in response to an instruction provided by the terminal apparatus; determining whether the user operation is the trigger operation; if the user operation is not the trigger operation, causing the image processing apparatus to perform the image processing operation whose details are defined by the operation specification information; and if the user operation is the trigger operation, starting up the external program associated with the operation information indicating the trigger operation.

12 Claims, 14 Drawing Sheets

(51) Int. Cl.
    *G06F 3/0484*     (2013.01)
    *G06F 3/0488*     (2013.01)
    *G06F 9/445*     (2018.01)
    *G06F 3/0481*     (2013.01)

(56) References Cited

U.S. PATENT DOCUMENTS

| | | | |
|---|---|---|---|
| 2007/0076244 A1* | 4/2007 | Suzuki | G06F 9/46 |
| | | | 358/1.15 |
| 2008/0201735 A1 | 8/2008 | Sumiyoshi et al. | |
| 2012/0075672 A1* | 3/2012 | Oishi | G06F 3/1204 |
| | | | 358/1.15 |
| 2012/0243043 A1 | 9/2012 | Asai | |
| 2015/0363165 A1* | 12/2015 | Zhou | G06F 3/167 |
| | | | 715/728 |
| 2016/0072971 A1* | 3/2016 | Ozaki | H04N 1/00482 |
| | | | 358/1.15 |
| 2016/0127581 A1* | 5/2016 | Suzuki | H04N 1/00307 |
| | | | 358/1.15 |
| 2016/0253074 A1* | 9/2016 | Qian | G06F 3/04883 |
| | | | 715/811 |
| 2017/0374221 A1* | 12/2017 | Asai | H04N 1/00973 |

\* cited by examiner

Fig.3

| APPLICATION ID | INSTALLATION STATUS INFORMATION | SC FLAG | OPERATION INFORMATION |
|---|---|---|---|
| PRINTING | NOT INSTALLED | OFF | TOTAL COUNT OF PRINTING OPERATION = 7 TIMES |
| PDF CONVERSION | NOT INSTALLED | OFF | TOTAL COUNT OF CONVERTING OPERATION = 5 TIMES |
| POSTCARD | INSTALLED | ON | SIZE ERROR TOTAL COUNT OF POSTCARD PRINTING OPERATION = 3 TIMES |
| EMAIL PRINTING | INSTALLED | OFF | TOTAL COUNT OF LOGIN ERROR OCCURRENCE = 5 TIMES |

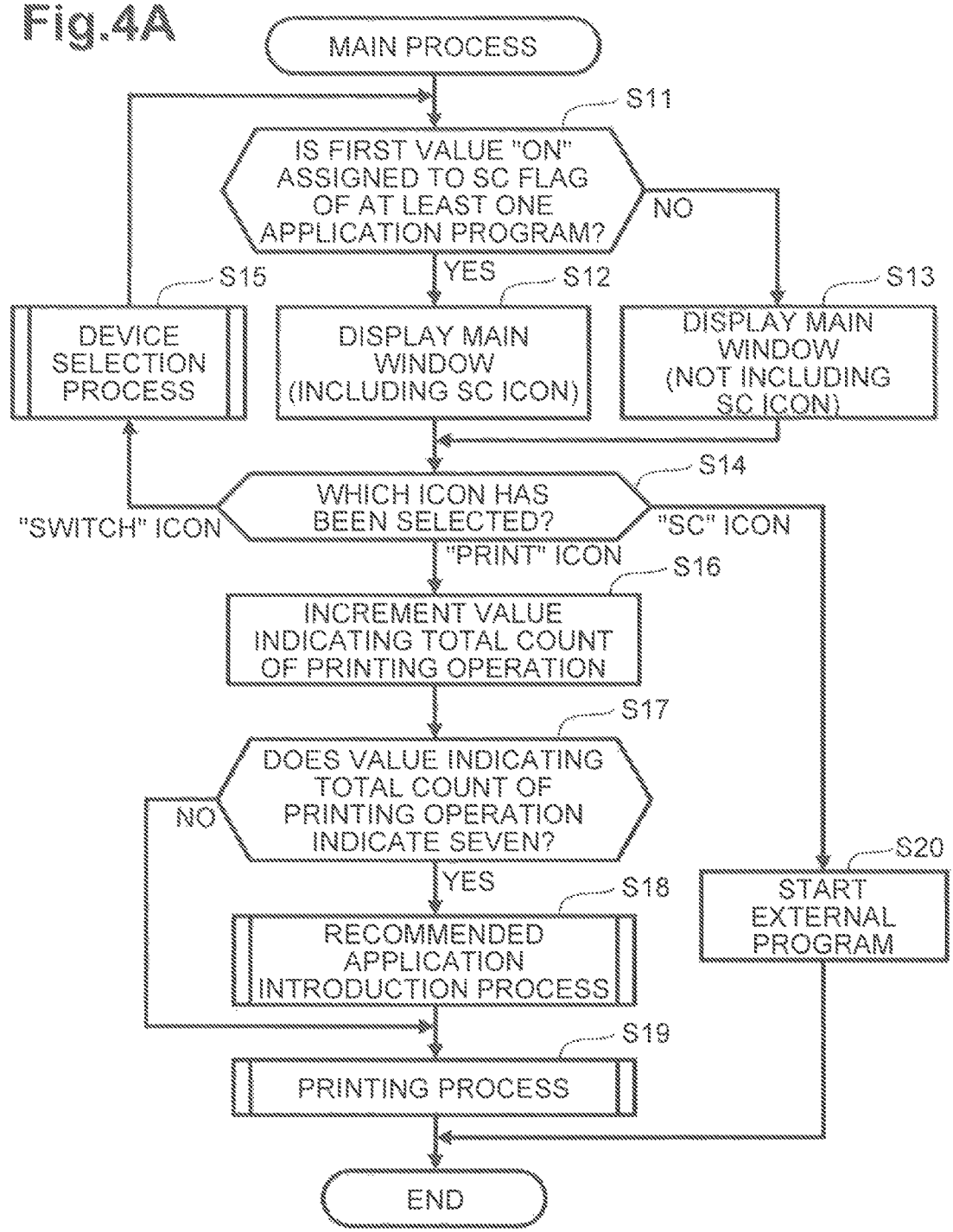

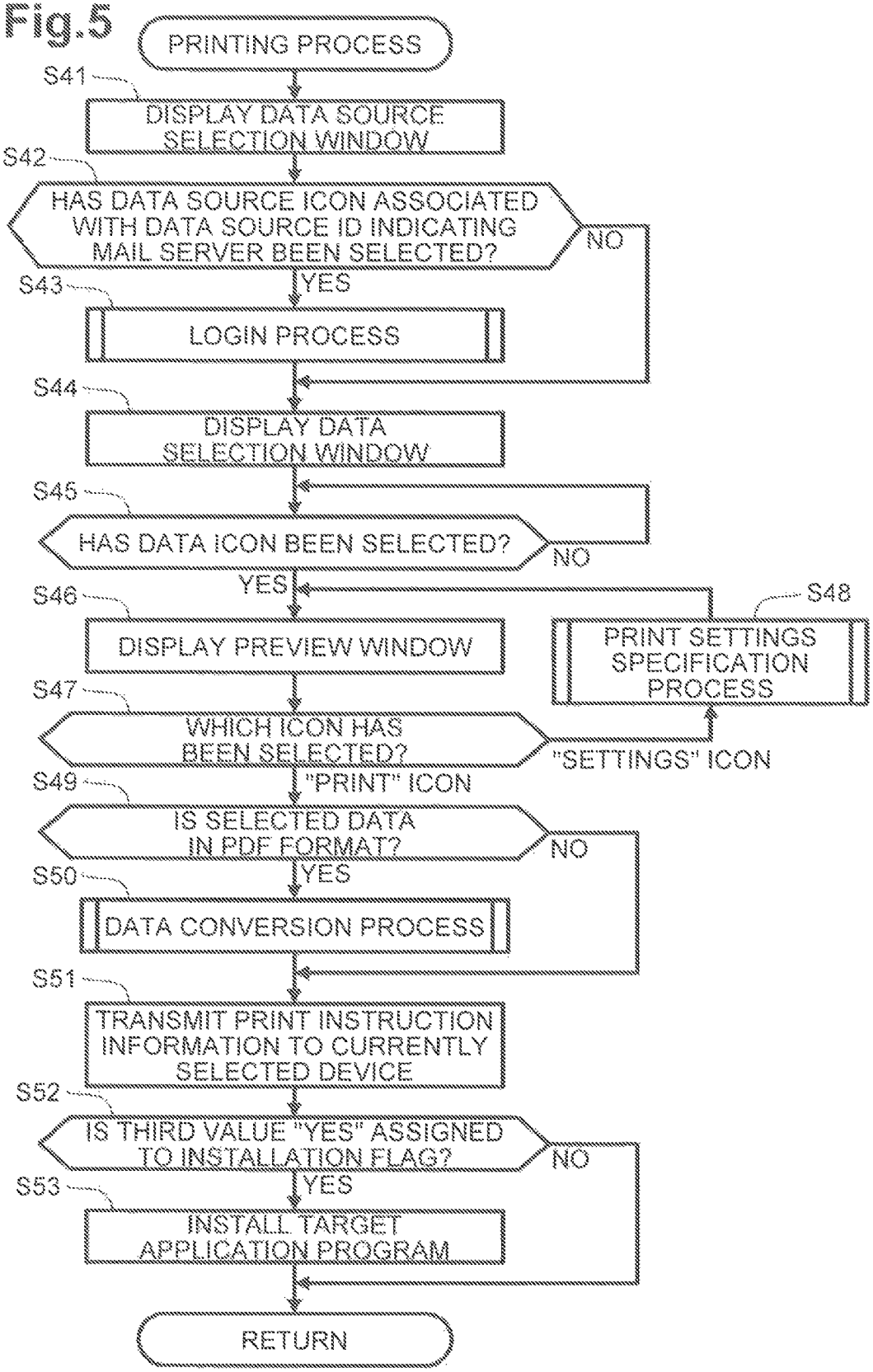

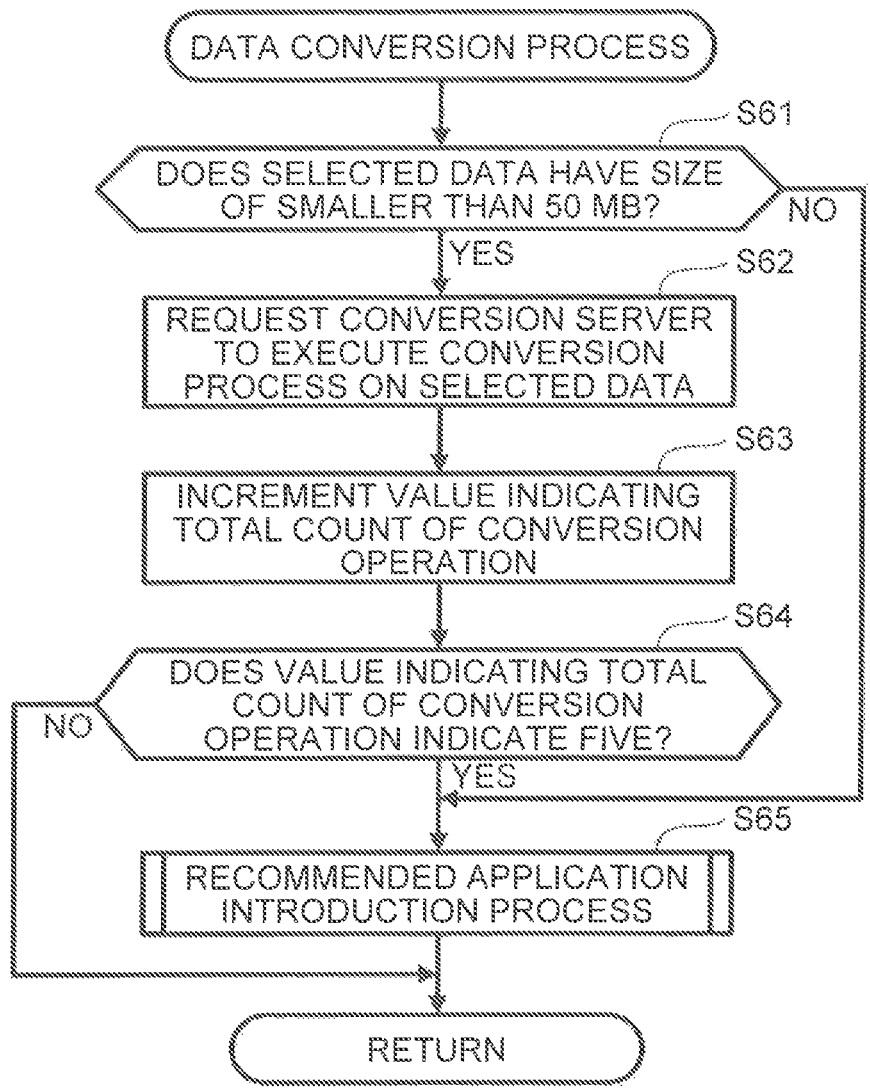

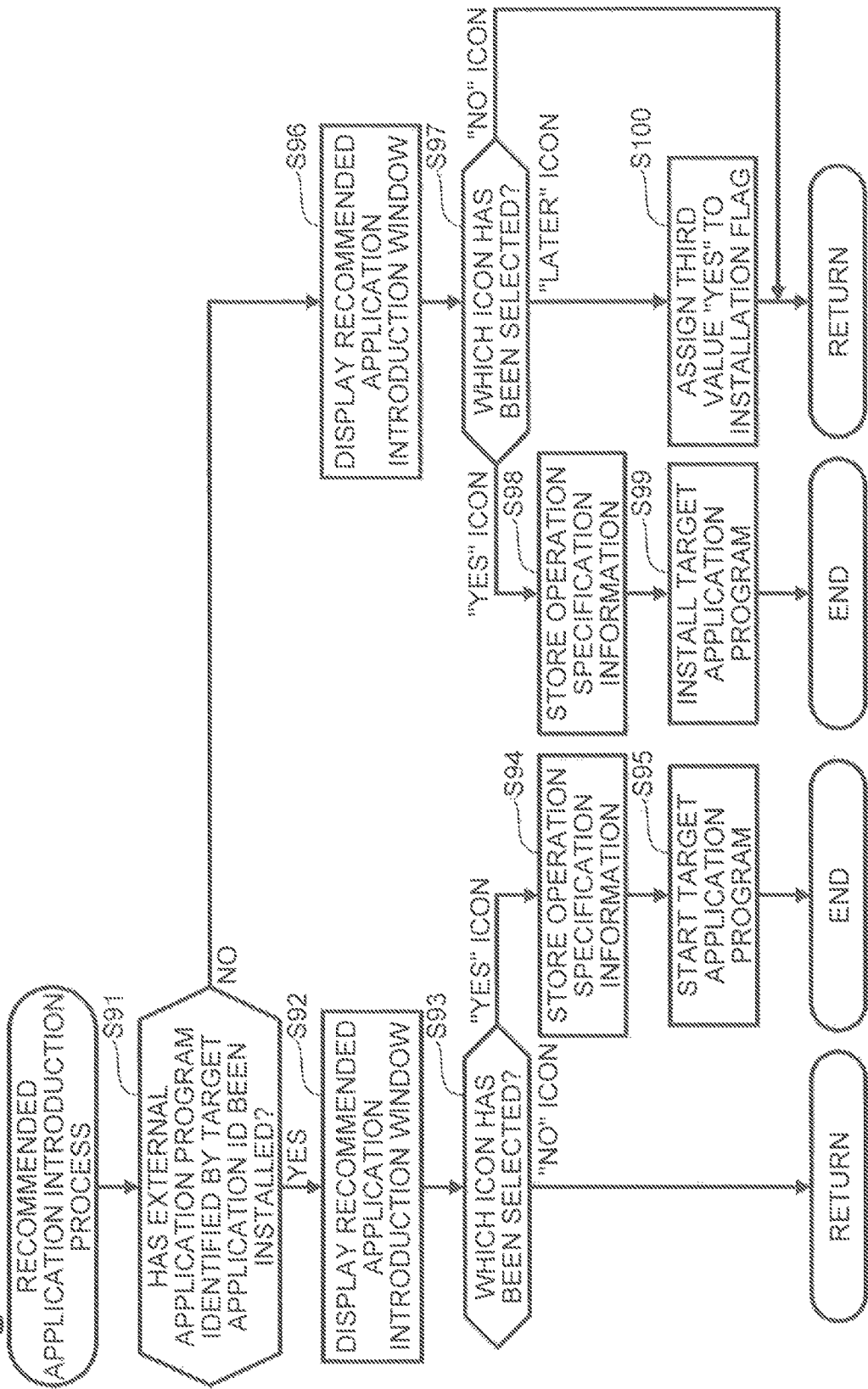

NON-TRANSITORY COMPUTER READABLE STORAGE MEDIUM STORING PROGRAM, AND TERMINAL APPARATUS ACCEPTING TRIGGER OPERATION FOR EXTERNAL APPLICATION

CROSS-REFERENCE TO RELATED APPLICATION

This application claims priority from Japanese Patent Application No. 2016-240812 filed on Dec. 13, 2016, the content of which is incorporated herein by reference in its entirety.

TECHNICAL FIELD

Aspects disclosed herein relate to a non-transitory computer readable storage medium storing a program of a mobile terminal for causing an image processing apparatus to perform an image processing operation.

BACKGROUND

Some known non-transitory computer readable storage medium stores a program of a terminal for causing an image processing apparatus to perform an image processing operation (hereinafter, referred to as the "terminal program"). For example, the terminal program is configured to start up a suitable program installed on the terminal from external to the terminal program (hereinafter, referred to as the "external program"). In one example, the external program substitutes for one or more functions of the terminal program. In another example, the external program complements one or more functions of the terminal program. More specifically, for example, the external program provides an interface for enabling a user to edit image data to be used in an image processing operation, or specializes in one or more of the functions of the terminal program.

SUMMARY

In some cases, using a suitable external program may be more useful and convenient for the user to implement a desired image processing operation than using the terminal program. Nevertheless, since the number of published programs on the Internet has been growing, it has become difficult for the user to recognize release of a suitable published program that provides one or more useful functions.

Accordingly, some embodiments of the disclosure provide for a technique of substituting an external program for a program that causes an image processing apparatus to perform an image processing operation, wherein the external program may be suitable for processing that the user intends to implement through the program.

According to the one or more aspects of the disclosure, a non-transitory computer-readable medium storing computer-readable instructions executable by a processor of a terminal apparatus comprising a memory, an input interface, and a communication interface, the terminal apparatus being communicably connectable to an image processing apparatus via the communication interface, the memory storing a plurality of sets of an external program and operation information associated with each other, the external program causing the image processing apparatus to perform an image processing operation, and the operation information indicating a trigger operation which is one of user operations acceptable via the input interface and triggers start-up of one of the external programs, wherein the instructions, when executed by the processor, cause the terminal apparatus to execute: in a first accepting process, accepting, via the input interface, a user operation specifying operation specification information that defines details of the image processing operation that is to be performed by the image processing apparatus in response to an instruction provided by the terminal apparatus; in a first determination process, determining whether the user operation accepted in the first accepting process is the trigger operation; in a case where it is determined that, in the first determination process, the user operation accepted in the first accepting process is not the trigger operation, in an operation instruction process, causing the image processing apparatus to perform the image processing operation whose details are defined by the operation specification information; and in a case where it is determined that, in the first determination process, the user operation accepted in the first accepting process is the trigger operation, in a first startup process, starting up the external program associated with the operation information indicating the trigger operation. According to the one or more aspects of the disclosure, a terminal apparatus communicably connectable to an image processing apparatus comprising: a memory, storing a plurality of sets of an external program and operation information associated with each other, the external program including instructions that cause the image processing apparatus to perform an image processing operation, and the operation information indicating a trigger operation which is one of user operations acceptable and triggers start-up of one of the external programs; an input interface; a communication interface; and a controller operatively connected to the communication interface and the memory, the controller configured to execute instructions from the memory that, when executed, cause the terminal apparatus to perform: accepting, via the input interface, a user operation for specifying operation specification information that defines details of the image processing operation that is to be performed by the image processing apparatus in response to an instruction provided by the terminal apparatus; determining whether the user operation is the trigger operation; in a case where it is determined that the user operation is not the trigger operation, causing the image processing apparatus to perform the image processing operation whose details are defined by the operation specification information; and in a case where it is determined that the user operation is the trigger operation starting up the external program associated with the operation information indicating the trigger operation. According to the one or more aspects of the disclosure, a method comprising: accepting, via an input interface of an terminal apparatus, a user operation for specifying operation specification information that defines details of an image processing operation that is to be performed by an image processing apparatus in response to an instruction provided by the terminal apparatus; determining whether the user operation; in a case where it is determined that the user operation is not the trigger operation, causing the image processing apparatus to perform the image processing operation whose details are defined by the operation specification information; and in a case where it is determined that the user operation is the trigger operation starting up the external program associated with the operation information indicating the trigger operation.

According to the one or more aspects of the disclosure, in response to performance of the trigger operation by the user for specifying the operation specification information, the external program corresponding to the trigger operation is started up, instead of execution of the operation instruction process. This may therefore enable a suitable external program to substitute for the program to execute processing that the user intends to implement through the program.

BRIEF DESCRIPTION OF THE DRAWINGS

For a more complete understanding of the present disclosure, needs satisfied thereby, and the objects, features, and advantages thereof, reference now is made to the following descriptions taken in connection with the accompanying drawings.

FIG. 3 is a program list stored in a memory in the illustrative embodiment according to one or more aspects of the disclosure.

FIG. 4A is a flowchart of a main process in the illustrative embodiment according to one or more aspects of the disclosure.

FIG. 5 is a flowchart of a printing process in the illustrative embodiment according to one or more aspects of the disclosure.

FIG. 6A is a flowchart of a data conversion process in the illustrative embodiment according to one or more aspects of the disclosure.

FIG. 7 is a flowchart of a recommended application introduction process in the illustrative embodiment according to one or more aspects of the disclosure.

DETAILED DESCRIPTION

Hereinafter, an illustrative embodiment will be described with reference to the accompanying drawings. The illustrative embodiment described below is merely an example. Various changes, arrangements and modifications may be applied therein without departing from the spirit and scope of the disclosure. In other embodiments, for example, the execution order of steps in each process may be changed without departing from the spirit and scope of the disclosure.

Figure 1:
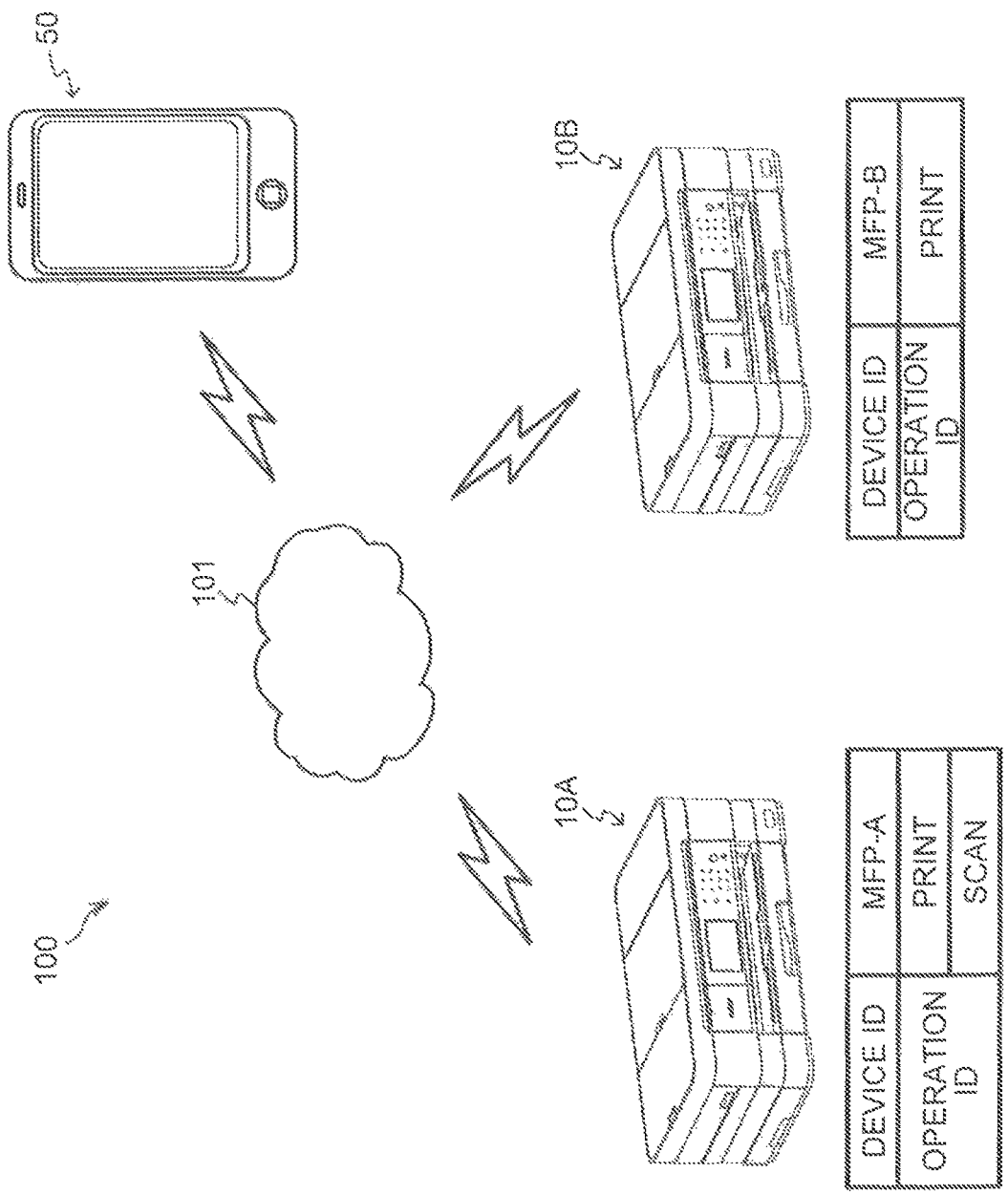
FIG. 1 is a schematic diagram illustrating a system in an illustrative embodiment according to one or more aspects of the disclosure.

FIG. 1 is a schematic diagram illustrating a system 100 according to the illustrative embodiment. The system 100 includes a multifunction peripherals ("MFP") 10A and a multifunction peripheral ("MFP") 10B and a mobile terminal 50. The MFP 10A and MFP 10B may also be each referred to as an MFP 10 without being distinguished therebetween. The MFPs 10 and the mobile terminal 50 are configured to communicate with each other via a communication network 101. The communication network 101 may be, for example, a wired local area network ("LAN"), a wireless LAN, or a combination of the wired LAN and the wireless LAN. In other embodiments, for example, the MFPs 10 and the mobile terminal 50 may be connected with each other via USB cables.

Figure 2A:
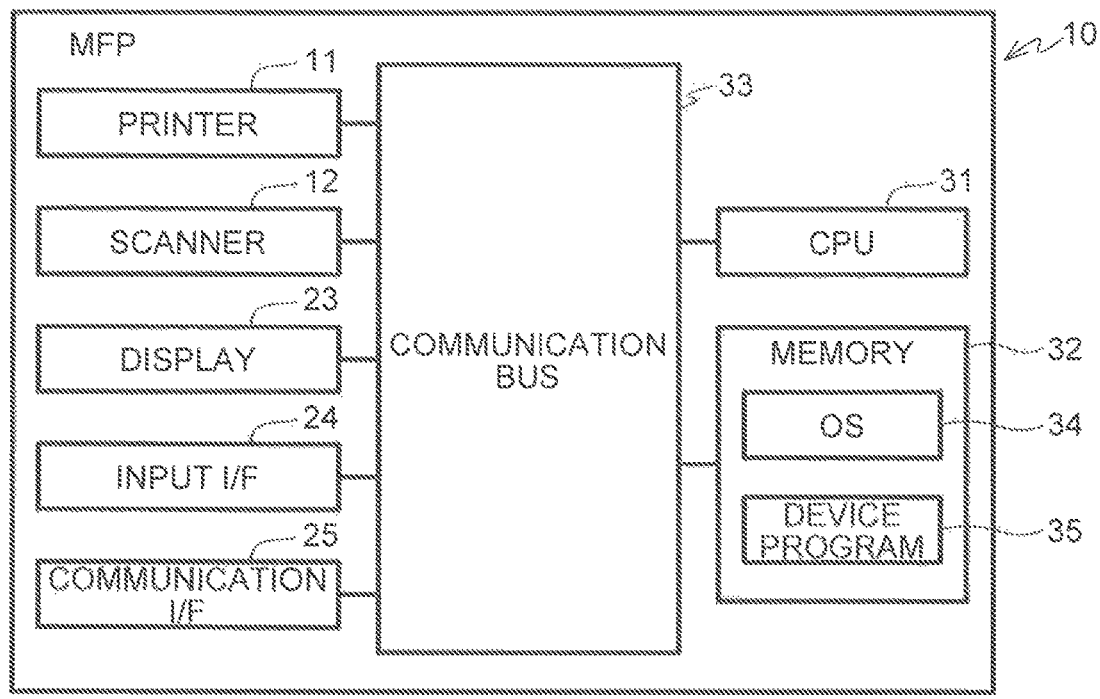
FIG. 2A is a block diagram of a multifunction peripheral in the illustrative embodiment according to one or more aspects of the disclosure.

In the illustrative embodiment, the MFPs 10 have the same or similar configuration, and therefore, one of the MFPs 10 will be described in detail and a description for the other will be omitted. As illustrated in FIG. 2A, the MFP 10 includes a printer 11, a scanner 12, a display 23, an input interface ("I/F") 24, a communication I/F 25, a CPU 31, a memory 32, and a communication bus 33.

The communication bus 33 connects between those units and components that constitute the MFP 10. The MFP 10 is an example of an image processing apparatus.

The printer 11 is hardware configured to perform a printing operation for recording an image represented by image data onto a sheet. In the illustrative embodiment, the printer 11 may be an inkjet printer that records an image by ink ejection. Nevertheless, in other embodiments, for example, the printer 11 may be another type of printer, e.g., an electrophotgraphic printer. The scanner 12 is hardware configured to perform a scanning operation for reading an image recorded on a document and generating image data (hereinafter, referred to as a "scan data") based on the read image. Each of the printing operation and the scanning operation is an example of an image processing operation. The printing operation is an example of a first operation. The scanning operation is an example of a second operation.

The image processing operation is not limited to the specific examples. In other embodiments, for example, the image processing operation may include a facsimile transmission operation for transmitting image data to an external device in compliance with a facsimile protocol, and a facsimile reception operation for receiving image data from an external device in compliance with the facsimile protocol. Each of the MFP 10A and the MFP 10B is configured to implement at least one image processing operation. The MFP 10A and the MFP 10B may implement respective different operations.

The printer 11 performs a printing operation in accordance with predetermined print settings. The settings for printing operation may be assigned with various parameters corresponding to respective setting items (e.g., "size", "sheet type", and "color"). The setting item "size" indicates a size of a sheet to be used for image recording, and includes various parameters, e.g., A4, B5, 3R (equivalent to Japanese L), and postcard. The setting item "sheet type" indicates a type of a sheet to be used for image recording, and includes various parameters, e.g., plan, and glossy. The setting item "color" indicates color tones for an image to be recorded on a sheet, and includes various parameters, e.g., color, and monochrome.

The scanner 12 is configured to perform a scanning operation in accordance with predetermined scan settings. The settings for scanning operation may be assigned with various parameters corresponding to respective setting items (e.g., "resolution", "color", and "format"). The setting item "resolution" indicates a reading resolution when the scanner 12 reads an image recorded on a document, and includes various parameters, e.g., 300 dpi, and 600 dpi. The setting item "color" indicates color tones of a read image, and includes various parameters, e.g., monochrome, 256 colors, and full color. The setting item "format" indicates a file format of scan data, and includes various parameters, e.g., PDF, TIFF, and JPEG.

The display 23 may be, for example, a liquid crystal display or an organic electroluminescent display. The display 23 includes a screen for displaying various information.

The input I/F 24 is a user interface for enabling a user to input various instructions. More specifically, the input I/F 24 includes buttons assigned various operation signals, respectively. The input I/F 24 is configured to, when a particular button is pressed, output an operation signal assigned to the pressed button. The input I/F 24 may further include, for example, a film-type touch sensor laminated over the screen of the display 23. A user operation includes, for example, selecting a particular object among one or more objects displayed on the screen of the display 23, and entering letters and/or numerals via the screen of the display 23. The object may be, for example, a text string, an icon, a button, a link, a radio button, a checkbox, or a dropdown menu, displayed on the display 23.

The input I/F 24 implemented as a touch sensor is configured to output location information that indicates a location of a user's touch on the screen. In the description, "touch" includes common tactile operations of an input device onto the screen. The "touch" may also include "hovering touch" or "Floating Touch™" (Floating Touch™ is a trademark owned by Sony Mobile communications AB of Lund, Sweden) which is proximity approach of an input device to the display screen but not a physical touch of the input device onto the screen. The input device may be, for example, a finger or a stylus. Tapping a particular location corresponding to one of objects displayed on the display 23 is an example of a user operation of selecting an object.

The communication I/F 25 is configured to enable the MFP 10 to communicate with an external device via the communication network 101. That is, the MFP 10 transmits or receives various information to or from the external device via the communication I/F 25. A communication protocol of the communication I/F 25 is not limited to a particular protocol. In one example, Wi-Fi® (Wi-Fi® is a registered certification mark owned by the Wi-Fi Alliance of Austin, Tex.) may be used as the communication protocol. In a case where a USB interface cable is used for connecting the MFP 10 and the mobile terminal 50 with each other, the communication I/F 25 may be an USB interface that allows the USB interface cable to be attached to and detached from the MFP 10.

The CPU 31 is configured to control overall operation of the MFP 10. The CPU 31 is configured to acquire various programs from the memory 32 and executes the programs based on various information outputted from the input I/F 24 and/or various information received from an external device via the communication I/F 25. A combination of the CPU 31 and the memory 32 is an example of a controller.

The memory 32 stores an OS 34, and a device program 35. The device program 35 may consist of a single program or a plurality of programs. The memory 32 stores data or information necessary for execution of the device program 35. The memory 32 includes one or a combination of, for example, a RAM, a ROM, an EEPROM, an HDD, a portable storage medium, e.g., a USB memory, attachable to and detachable from the MFP 10, and a buffer of the CPU 31.

The memory 32 may be a computer-readable storage medium. The computer-readable storage medium may be a non-transitory medium. The non-transitory medium may include, for example, recording media, such as CD-ROMs and DVD-ROMs, as well as the above-described examples. The non-transitory medium may be a tangible medium. An electrical signal carrying a program downloaded from a server on the Internet may be a computer-readable signal medium which is one of computer-readable media. Nevertheless, the electrical signal might not be included in a non-transitory computer-readable storage medium. A memory 62 of the mobile terminal 50 has the same or similar configuration to the memory 32.

A Management Information Base ("MIB") in the memory 32 stores device information (refer to FIG. 1). The device information includes a device identifier ("ID") and an operation ID. The device ID identifies an MFP 10. The operation ID identifies a type of each of one or more image processing operations that the MFP 10 can perform. The device ID may be indicated in any format, e.g., in a text format, or in a binary format, if each of the MFPs 10A and 10B can be uniquely identified on the communication network 101. The operation ID, an application ID, and a data ID are indicated in the same manner as the device ID.

More specifically, in the illustrative embodiment, the MFP 10A is identified by a device ID "MFP-A", and is capable of selectively performing a printing operation identified by an operation ID "print" and a scanning operation identified by an operation ID "scan". The MFP 10B is identified by a device ID "MFP-B", and is capable of performing a printing operation identified by an operation ID "print".

Figure 2B:
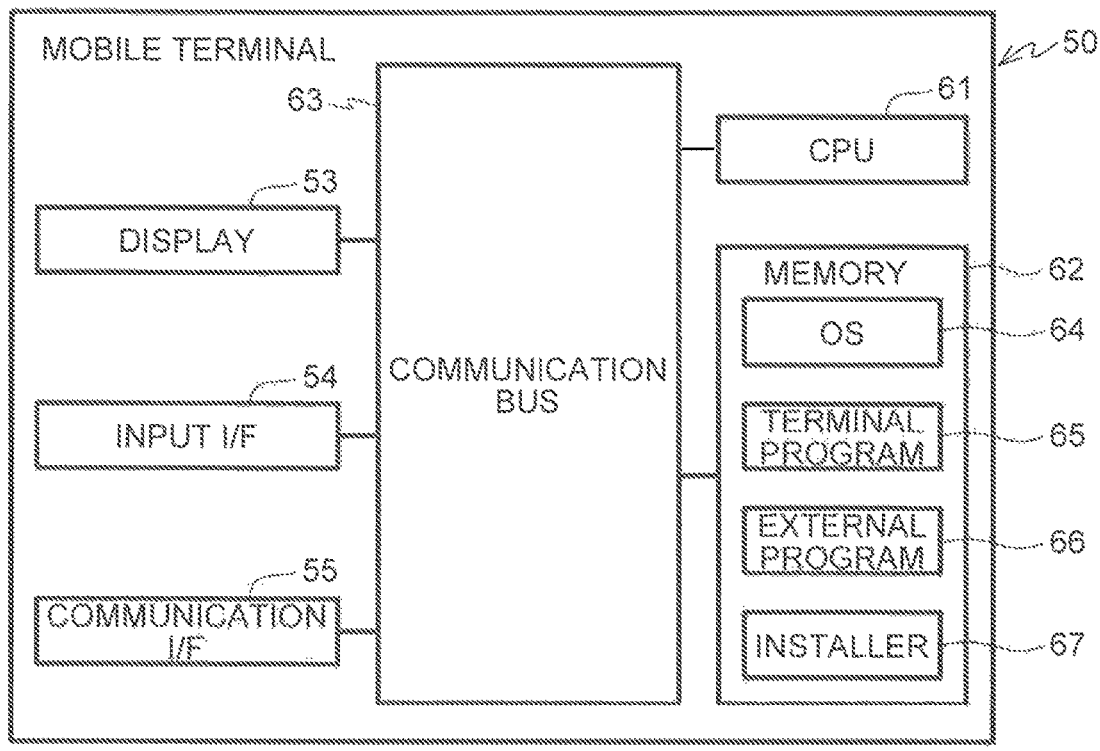
FIG. 2B is a block diagram of a mobile terminal in the illustrative embodiment according to one or more aspects of the disclosure.

As illustrated in FIG. 2B, the mobile terminal 50 includes a display 53, an input I/F 54, a communication I/F 55, a CPU 61, a memory, 62, and a communication bus 63. The display 53, the input I/F 54, the communication I/F 55, the CPU 61, the memory, 32, and the communication bus 33 of the mobile terminal 50 have the same or similar configuration to the respective corresponding ones of the MFP 10. Therefore, detailed descriptions for those components will be omitted. A combination of the CPU 61 and the memory 62 is another example of the controller.

The mobile terminal 50 may be, for example, a mobile phone, a smartphone, or a tablet. More specifically, the display 53 of the mobile terminal 50 has a screen size of, preferably, 12 inch or smaller, more preferably, 8 inch or smaller. The input I/F 54 of the mobile terminal 50 preferably includes a touch sensor laminated over the screen of the display 53. The memory 62 stores an OS 64, a terminal program 65, at least one external program 66 installed on the mobile terminal 50 from external, and an installer 67.

The OS 64 may be, for example, Android OS (Android™ is a trademark owned by Google Inc. of Mountain View, Calif.), iOS (iOS® is a registered trademark owned by Cisco Technology, Inc. of San Jose, Calif.), or Windows Phone® Operating System (Windows Phone® is a registered trademark owned by Microsoft Corporation of Redmond, Wash.). The OS 64 enables two or more of the programs installed on the mobile terminal 50 to run concurrently. The two or more programs run virtually in concurrence with each other by, for example, a time-division multiplexing. The OS 64 enables one of the concurrently-running programs to run in the foreground and the remainder of the concurrently-running programs to run in the background.

When a particular program is running in the foreground, a window involved in the foreground running program occupies a majority portion of a display area of the display 53. That is, the mobile terminal 50 enables only the window involved in the foreground running program of the concurrently-running programs to be visibly displayed on the display 53.

The terminal program 65 is configured to cause the MFP 10, which has been connected to the mobile terminal 50 via the communication I/F 55, to execute an image processing operation. More specifically, for example, the terminal program 65 enables a user to specify operation specification information (e.g., selected device information, a selected operation ID, a selected data source ID, a selected data ID, and specified setting information) and causes the MFP 10 to perform an image processing operation identified by the operation specification information.

The terminal program 65 may start up, as a plug-in program, the external program 66 installed on the mobile terminal 50. The terminal program 65 executes an application program interface ("API") provided by the OS 64 (hereinafter, referred to as a "startup API") by assigning a program ID of the external program 66 as an argument. In response to execution of the startup API, the OS 64 starts up the external program 66 identified by the passed program ID. Thus, the external program 66 executes a predetermined operation and then passes the execution result of the operation as a return value of the startup API.

The relationship between the terminal grogram 65 and the external program 66 is not limited to the specific example. In other embodiments, for example, the terminal program 65 may start up the external program 66 using a sharing function provided by the OS 64. The external program 66 started up by the terminal program 65 may complete the predetermined operation without passing the execution result of the operation to the terminal program 65.

The external program 66 is a separate program from the terminal program 65 and is capable of being executed independently of the terminal program 65. That is, the external program 66 is different from a subroutine of the terminal program 65. The external program 66 is configured to run on the same mobile terminal 50 on which the terminal program 65 runs.

In the illustrative embodiment, the at least one external program 66 may be, for example, a printing application, a PDF conversion application, a postcard maker application, and an email printing application. The functions of the external programs 66 are not limited to the specific example. For example, an external program 66 may have a function that the terminal program 65 does not have. Another external program 66 may enable the function of the terminal program 65 to be implemented more simply. Still another external program 66 may have further detailed functions which are originated in the functions of the terminal program 65.

The printing application is an external program 66 that may specialize in causing the MFP 10 to perform a printing operation. More specifically, the printing application is an application program that is configured to only instruct the MFP 10 to perform a printing operation, but not instruct the MFP 10 to perform the other image processing operations. The printing application requires from a user fewer operation events for causing the MFP 10 to perform a printing operation in accordance with, for example, default settings (e.g., "size"=A4, "sheet type"=plain, "color"=color) as compared with the terminal program 65. Further, the printing application provides more variations of the print settings than the terminal program 65. For example, the printing application may provide more setting items and/or more parameters for each setting item than those provided by the terminal program 65.

The PDF conversion application is an external program 66 that may have a function of converting a format of data to be used in a printing operation from PDF format to JPEG format. The PDF format is an example of a first format, and the JPEG format is an example of a second format. The format conversion may be a process for converting data format only from PDF format to JPEG format without substantially changing contents of an image represented by data in PDF format (hereinafter, referred to as a "conversion process").

The conversion process may be executed by a conversion server (not illustrated) on the Internet instead of the PDF conversion application. Nevertheless, the conversion server is configured to convert data having a data size of smaller than 50 MB. On the other hand, the PDF conversion application does not impose such a data size limitation. The data size of 50 MB is an example of a threshold size. In other embodiments, for example, the conversion server may impose another limitation, e.g., an upper limit of pages included in data in PDF format (e.g., 20 pages), as well as the data size limitation.

The postcard maker application is an external program 66 that may specialize in postcard printing. The postcard maker application is configured to edit an image to be recorded on a communication side of a postcard (e.g., a New Year's card) in accordance with user instructions and cause the MFP 10 to perform a printing operation for recording the edited image on the communication side of the postcard. The postcard maker application may enable the user to provide more variations of instructions for editing an image to be recorded on a communication side of a postcard (e.g., an instruction to combine a photo, sender information, and/or desired text into a template image) as compared with instructions to be provided through the terminal program 65.

The email printing application is an external program 66 that may specialize in email printing. The email printing application is configured to acquire an email addressed to a predetermined account and cause the MFP 10 to perform a printing operation for printing the acquired email. The email printing application may handle more varieties of email domains than the terminal program 65. Further, the email printing application may provide the user with an error message and/or help in more detail when an error occurs, as compared with the terminal program 65.

The installer 67 is a program for installing an external program 66 on the mobile terminal 50. For example, the installer 67 downloads an execution file of a selected external program 66 from a particular server on the Internet and stores the downloaded execution file in a predetermined area of the memory 62. The installer 67 has a known function, and therefore, a detailed description for the function will be omitted.

As illustrated in FIG. 3, for example, the memory 62 is configured to store an application program list. The application program list includes one or more program records. The one or more program records are stored in the memory 62 at the time of installation of the terminal program 65 on the mobile terminal 50. Each of the program records corresponds to a respective one of the external programs 66 that can be started up by the terminal program 65. Each of the program records includes an application ID, installation status information, a short-cut ("SC") flag, and operation information. The program record is an example of a set of an external program and operation information.

The application ID identifies an external program 66 that can be started up by the terminal program 65. That is, the printing application is identified by an application ID "printing", the PDF conversion application is identified by an application ID "PDF conversion", the postcard maker application is identified by an application ID "postcard", and the email printing application is identified by an application ID "email printing".

The installation status information indicates whether an external program 66 identified by a corresponding application ID has been installed on the mobile terminal 50. In the illustrative embodiment, for example, the installation status information includes options of "Not Installed" and "Installed", of which one is assigned as the installation status information. The option "Not Installed" indicates that an external program 66 identified by a corresponding application ID is not installed on the mobile terminal 50. The option "Installed" indicates that an external program 66 identified by a corresponding application ID has been installed on the mobile terminal 50.

The SC flag indicates whether an SC icon for an external program 66 identified by a corresponding application ID needs to be displayed on a main window. The SC flag includes options of a first value "ON" and a second value "OFF", of which one is assigned as a value of the SC flag. The first value "ON" indicates that an SC icon needs to be displayed on the main window. The second value "OFF" indicates that an SC icon does not need to be displayed on the main window. For example, the first value "ON" may be assigned as the value of the SC flag for an external program 66 that has been installed in a recommended application introduction process. The second value "OFF" may be assigned as the value of the SC flag for an external program 66 that is not installed on the mobile terminal 50 and for an external program 66 that has been installed in another manner or process except the recommended application introduction process.

The operation information indicates information relating to a trigger operation acceptable via the input I/F 54. The trigger operation may be a user operation that triggers start-up of an external program 66 identified by a corresponding application ID and is performed by the user on a particular window that is caused by the terminal program 65 to be displayed on the display 53. The information relating to a particular operation included in the operation information may be assigned by a developer of the terminal program 65 in advance, or may be assigned through deep learning of operation histories of the terminal program 65. One or more pieces of operation information may be associated to an application ID. The number of times that a particular operation has been performed (e.g., three times, five times, and seven times) included in the operation information is an example of a threshold value, and therefore, the values are not limited to those specific examples. The details of the operation information are also not limited to those specific examples.

In FIG. 3, the operation information "total count of printing operation=7 times" indicates that, in response to reaching of the total count of particular operation for instructing the MFP 10 to perform a printing operation, to seven times, the terminal program 65 starts up the printing application. The operation information "total count of converting process=5 times" indicates that, in response to reaching of the total count of particular operation for instructing the conversion server to perform a conversion process, to five times, the terminal program 65 starts up the PDF conversion application. The operation information "size error" indicates that, in response to execution of particular operation for instructing the conversion server to covert data having a size of 50 MB or larger, the terminal program 65 starts up the PDF conversion application. The operation information "total count of postcard printing operation=3 times" indicates that, in response to reaching of the total count of particular operation for instructing the MFP 10 to perform a printing operation in accordance with the print settings including "size=postcard", to three times, the terminal program 65 starts up the postcard maker application. The operation information "total count of login error occurrence=5 times" indicates that, in response to reaching of the total count of particular operation for entering wrong account information on a login window of a mail server (not illustrated) on the Internet, to five times, the terminal program 65 starts up the email printing application.

The memory 62 is further configured to store selected device information. The selected device information may be device information that relates to an MFP 10 selected in a device selection process (hereinafter, referred to as a "selected device") and is stored in the MIB of the MFP 10. In a case where no MFP 10 has been selected, the memory 62 stores no selected device information.

The memory 62 is configured to store count information indicating, for example, the total count of printing operation, the total count of converting operation, the total count of postcard printing operation, and the total count of error occurrence. The total count of printing operation, the total count of converting operation, the total count of postcard printing operation, and the total count of error occurrence each indicate the cumulative total number of times a corresponding particular operation has been performed. A value of each of the total count of printing operation, the total count of converting operation, the total count of postcard printing operation, and the total count of error occurrence is incremented in respective steps S16, S63, S74, and S83. In response to reaching of the count to the threshold value of the operation information, the value indicating the count is initialized to an initial value (=0 (zero)).

The memory 62 is further configured to store an installation flag (not illustrated). The installation flag indicates whether a target application needs to be installed subsequent to provision of an instruction to perform an image processing operation to an MFP 10. The installation flag includes parameters of a third value "YES" and a fourth value "NO", of which one is assigned as a value of the installation flag. The third value "YES" indicates that a target application needs to be installed. The fourth value "NO" indicates that a target application does not need to be installed. An initial value of the installation flag may be the fourth value "NO".

In other embodiments, for example, the memory 62 may be further configured to store a data folder. The data folder may store, for example, photo data, document data, presentation data, and/or spreadsheet data. Any data stored in the data folder may be used in a printing operation.

[Behavior of System 100]

Referring to FIGS. 4A to 7, a description will be made on how the system 100 behaves. It is assumed that, at the time of starting a main process of FIG. 4A, the memory 62 of the mobile terminal 50 stores the device information of the MFP 10A as the selected device information. It is further assumed that the printing application and the PDF conversion application are not installed on the mobile terminal 50 while the postcard maker application and the email printing application have already been installed on the mobile terminal 50.

Flowcharts show processing executed by the CPU 31 or by the CPU 61 in accordance with instructions described in programs. The processing executed by the CPU 31 or by the CPU 61 includes hardware control executed via the OS 34 or the OS 64. Throughout the description, "data" is represented by a computer-readable bit string. Even if "data" has different formats in different situations, the "data" is treated as the same data unless the data indicates the same description. Throughout the description, "information" is treated in the same manner as "data".

The OS 64 of the mobile terminal 50 displays a menu window (not illustrated) on the display 53 of the mobile terminal 50. The menu window includes one or more icons each corresponding to an application program that has been installed on the mobile terminal 50. In the illustrative embodiment, more specifically, for example, the menu window includes at least an icon corresponding to the terminal program 65, an icon corresponding to the postcard maker application, and an icon corresponding to the email printing application. The OS 64 accepts a user operation performed on the menu window through the input I/F 54.

In one example, in response to selection of the icon corresponding to the postcard maker application, the OS 64 starts up and executes the postcard maker application in the foreground. In another example, in response to selection of the icon corresponding to the terminal program 65, the OS 64 starts up and executes the terminal program 65 in the foreground. Hereinafter, a description will be made on processing to be executed in a case where the icon corresponding to the terminal program 65 is selected.

[Main Process]

Figure 4B:
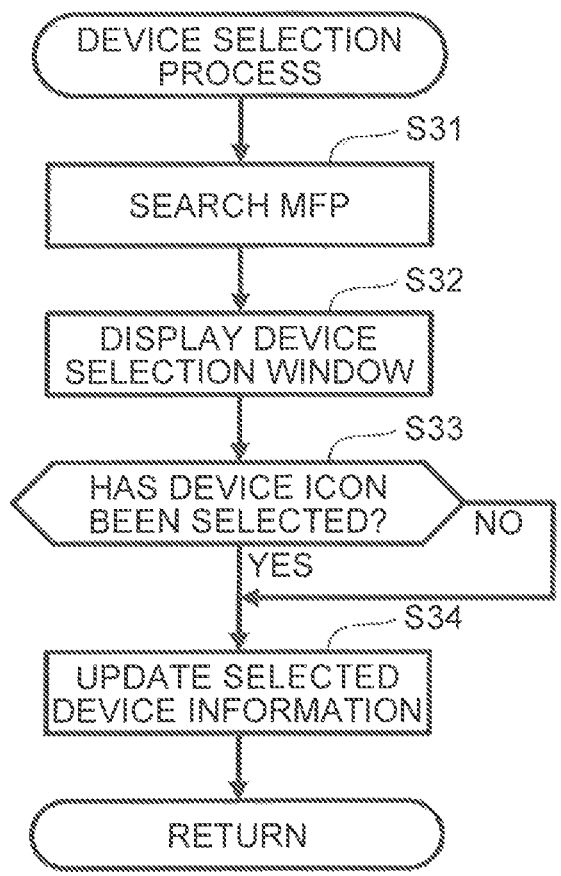
FIG. 4B is a flowchart of a device selection process in the illustrative embodiment according to one or more aspects of the disclosure.
Figure 8A:
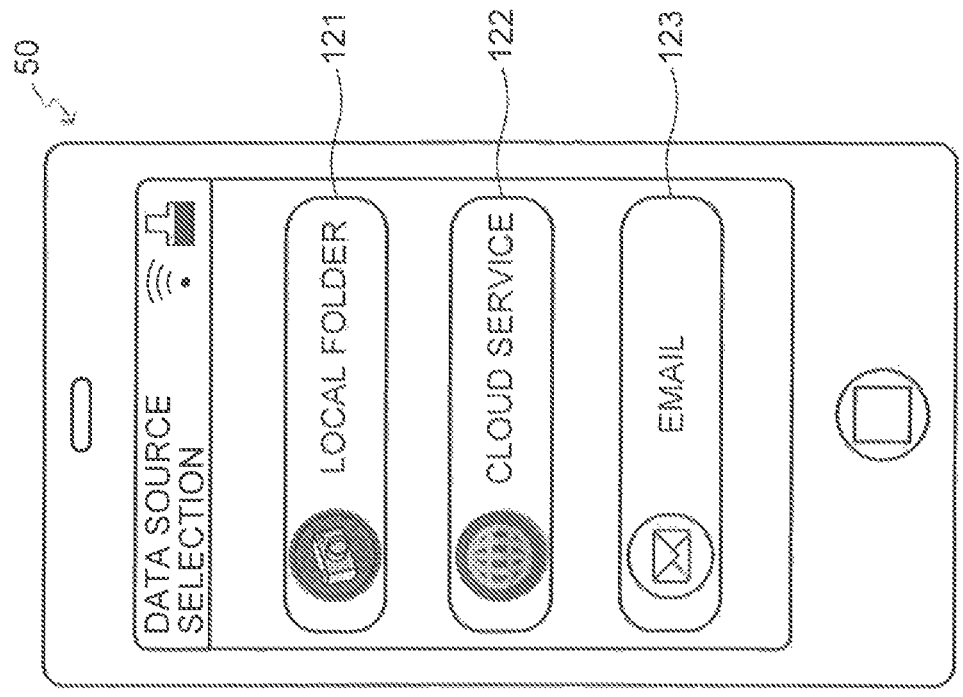
FIG. 8A illustrates an example window to be displayed on a display in the illustrative embodiment according to one or more aspects of the disclosure, wherein a main window is displayed.

As illustrated in FIG. 4A, in response to start-up of the terminal program 65 by the OS 64, the terminal program 65 executes a main process. If the terminal program 65 determines that the first value "ON" is assigned to the SC flag of at least one of the one or more installed program applications in the program list (e.g., YES in step S11), the terminal program 65 displays, on the display 53, the main window including at least one SC icon corresponding to the at least one of the one or more installed program applications whose value of the SC flag is assigned with the first value "ON" (e.g., step S12). As illustrated in FIG. 8A, in the illustrative embodiment, for example, the main window includes an SC icon 113 corresponding to the postcard maker application. More specifically, for example, the main window includes operation icons 111 and 112, the SC icon 113, and a switch icon 114. Each of the operation icons 111 and 112 is an example of a candidate object. The SC icon 113 is an example of a shortcut object. The switch icon 114 is another example of the candidate object.

The operation icons 111 and 112 each correspond to an instruction to perform an image processing operation. The operation icon 111 is associated with the operation ID "print". The operation icon 112 is associated with the operation ID "scan". The operation ID associated to each of the operation icons 111 and 112 is an example of candidate information that may be a candidate for operation specification information. The SC icon 113 corresponds to an instruction to start up the postcard maker application whose value of the SC flag is assigned with the first value "ON". The switch icon 114 corresponds to an instruction to switch the currently-selected device to another device. In the illustrative embodiment, the switch icon 114 indicates the device ID "MFP-A" included in the selected device information (refer to FIG. 8A). In a case where the memory 62 does not store any selected device information, the switch icon 114 indicates a text string, e.g., "Not selected", that indicates that no device has been selected.

If the terminal program 65 determines that the first value "ON" is assigned to the SC flag of none of the one or more installed program applications in the program list (e.g., NO in step S11), the terminal program 65 displays, on the display 53, the main window not including any SC icon (e.g., step S13). Processing executed in each of step S12 and S13 is an example of a display process. Subsequent to step S12 or S13, in response to receipt of a user operation performed on the main window via the input I/F 54, the terminal program 65 determines which icon has been selected (e.g., step S14).

If the terminal program 65 determines that the switch icon 114 has been selected via the input I/F 54 (e.g., "SWITCH" ICON in step S14), the terminal program 65 executes a device selection process (e.g., step S15). The device selection process is for changing the currently-selected device in accordance with an instruction provided by the user. Referring to FIG. 4, the device selection process will be described in detail.

[Device Selection Process]

The terminal program 65 searches one or more MFPs 10 with which the terminal program 65 can communicate via the communication I/F 55, using, for example, Simple network Management Protocol ("SNMP") (e.g., step S31). More specifically, for example, the terminal program 65 broadcasts transmission request information to a communication network 101 via the communication I/F 55. In the illustrative embodiment, the terminal program 65 receives device information transmitted from each of the MFPs 10A and 10B through the communication I/F 55 in response to the transmission request information. That is, the terminal program 65 determines that each of the MFPs 10A and 10B that is the sender of the device information is an MFP 10 that can communicate with the terminal program 65. In other embodiments, for example, the terminal program 65 may search one or more MFPs 10 that can communicate with the terminal program 65 by another searching method.

Subsequent to step S31, the terminal program 65 displays a device selection window (not illustrated) on the display 53 (e.g., step S32). The device selection window includes, for example, device icons each corresponding to the device information of a corresponding one of the MFPs 10A and 10B found in step S31. The device icon is another example of the candidate object. The device information associated to the device icon is another example of the candidate information. Subsequent to step S32, in response to receipt of a user operation performed on the device selection window via the input I/F 54, the terminal program 65 determines whether the device icon has been selected (e.g., step S33).

If the terminal program 65 determines that one of the one or more device icons corresponding to the one or more MFPs 10 found in step S31 (e.g., the device icon corresponding to the MFP 10B) has been selected via the input I/F 54 (e.g., YES in step S33), the terminal program 65 stores the device information received from the newly selected MFP 10 (e.g., the MFP 10B) in the memory 62 as the selected device information (e.g., step S34). In a case where the memory 62 has stored selected device information relating to a previously-selected device, the terminal program 65 writes new selected device information over the existing information.

Subsequent to step S34 of the device selection process, the routine returns to the main process. As illustrated in FIG. 4A, the terminal program 65 displays the updated main window on the display 53 (e.g., steps S11, and S12 or S13). In the illustrative embodiment, because the device icon corresponding to the MFP 10B was selected in the device selection process, the switch icon 114 included in the current main window indicates the selected device ID "MFP-B". Further, because the MFP 10B is not capable of performing a scanning operation, the main window does not include the operation icon 112 associated with the operation ID "scan". If the terminal program 65 determines that the operation icon 111 associated with the operation ID "print" has been selected via the input I/F 54 (e.g., "PRINT" ICON in step S14), the terminal program 65 temporarily stores the operation ID "print" associated to the operation icon 111 in the memory 62, as a selected operation ID. Processing executed in step S14 for accepting selection of the operation icon 111 is an example of a first acceptance process.

In response to the determination that the operation icon 111 associated with the operation ID "print" has been selected (e.g., PRINT in step S14), the terminal program 65 increments a value indicating the total count of printing operation stored in the memory 62 by 1 (one) (e.g., step S16). Subsequent to step S16, the terminal program 65 determines whether the value indicating the current total count of printing operation indicates seven, which is the threshold value (e.g., step S17). If the terminal program 65 determines that the value indicating the current total count of printing operation indicates seven (e.g., YES in step S17), the terminal program 65 determines that a trigger operation corresponding to the application ID "printing" has been accepted, and thus temporarily stores the application ID "printing" in the memory 62, as a target application ID. The seventh time user operation of selecting the operation icon 111 is an example of a trigger operation. Processing executed in step S17 is an example of a first determination process.

In response to the determination that the value indicating the current total count of printing operation indicates seven (e.g., YES in step S17), the terminal program 65 executes the recommended application introduction process (e.g., step S18). The recommended application introduction process is for introducing an external program 66 identified by the target application ID (hereinafter, also referred to as the "target application") to the user of the mobile terminal 50. If the terminal program 65 determines the value indicating the current total count of printing operation has not reached seven (e.g., NO in step S17), the terminal program 65 executes a printing process (e.g., step S19). The printing process is for causing the selected device to perform a printing operation. Referring to FIG. 5, the printing process will be described in detail.

[Printing Process]

Figure 8B:
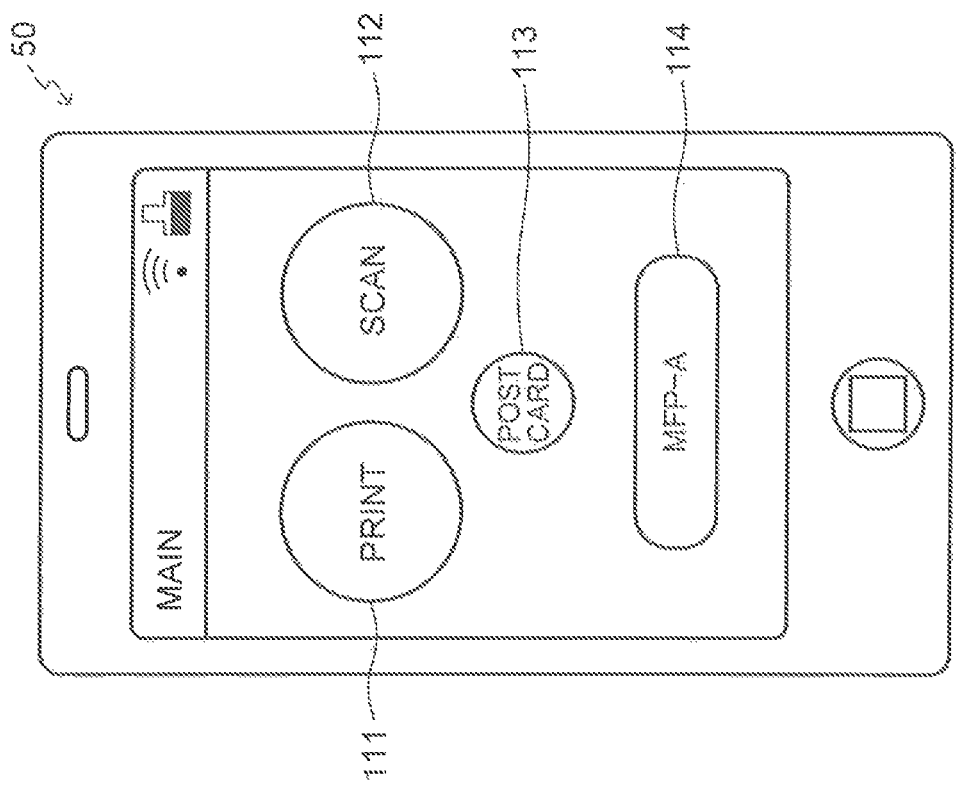
FIG. 8B illustrates another example window to be displayed on the display in the illustrative embodiment according to one or more aspects of the disclosure, wherein a data source selection window is displayed.

As illustrated in FIG. 8B, the terminal program 65 displays a data source selection window on the display 53 (e.g., step S41). The data source selection window includes data source icons 121, 122, and 123 corresponding respective sources of data that may be used in a printing operation. Subsequent to step S41, in response to receipt of a user operation performed on the data source selection window via the input I/F 54, the terminal program 65 determines whether one of the data source icon has been selected (e.g., step S42). Processing executed in step S42 is another example of the first determination process.

As illustrated in FIG. 8B, the data source icon 121 is associated with a data source ID indicating the memory 62. The data source icon 122 is associated with a data source ID indicating a storage server (not illustrated) on the Internet (e.g., a URL). The data source icon 123 is associated with a data source ID indicating a mail server (not illustrated) on the Internet (e.g., a domain name). Each of the data source icons 121, 122, and 123 is another example of the candidate object. The data source ID associated to each of the data source icons 121, 122, and 123 is another example of the candidate information.

Subsequent to step S41, if the terminal program 65 determines that any data source icon (e.g., the data source icon 121) other than the data source icon 123 has been selected via the input I/F 54 (e.g., NO in step S42), the terminal program 65 temporarily stores the data source ID indicating the selected data source (e.g., the memory 62), as a selected data source ID, in the memory 62. In such a case, subsequent to step S42, the terminal program 65 displays a data selection window (refer to FIG. 9A) on the display 53 (e.g., step S44). Subsequent to step S44, in response to receipt of a user operation performed on the data selection window via the input I/F 54, the terminal program 65 determines whether one of the data icon has been selected (e.g., step S45). Processing executed in step S45 is another example of the first determination process.

Figure 9B:
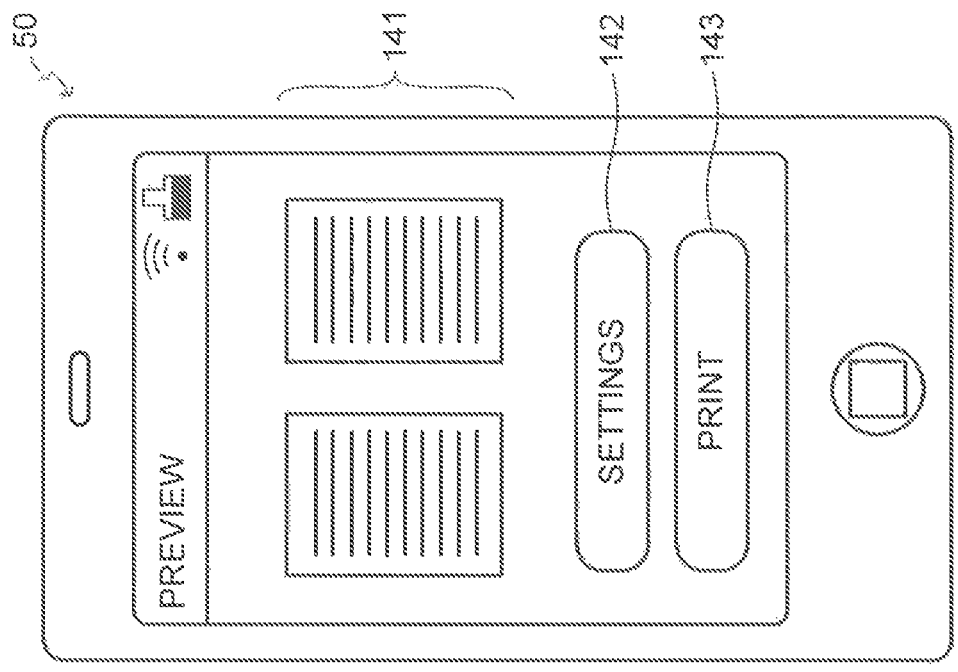
FIG. 9B illustrates another example window to be displayed on the display in the illustrative embodiment according to one or more aspects of the disclosure, wherein a preview window for selected data "Estimate.PDF" is displayed.
Figure 9A:
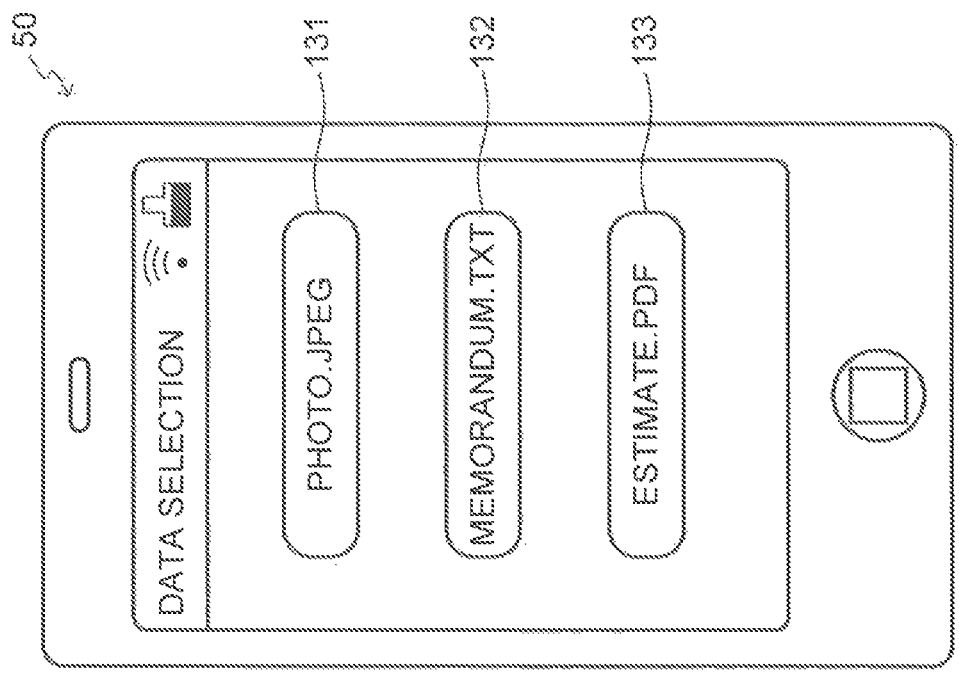
FIG. 9A illustrates another example window to be displayed on the display in the illustrative embodiment according to one or more aspects of the disclosure, wherein a data selection window is displayed.

As illustrated in FIG. 9A, the data selection window includes data icons 131, 132, and 133. The data icons 131, 132, and 133 are associated with respective data IDs identifying data pieces stored in the memory 62. Each of the data icons 131, 132, and 133 is another example of the candidate object. The data ID associated to each of the data icons 131, 132, and 133 is another example of the candidate information.

If the terminal program 65 determines that one (e.g., the data icon 133) of the data icons has been selected via the input I/F 54 (e.g., YES in step S45), the terminal program 65 temporarily stores a data ID (e.g., a data ID "Estimate.PDF") associated to the selected data icon (e.g., the data icon 133), as a selected data ID, in the memory 62. Subsequent to step S45, as illustrated in FIG. 9B, the terminal program 65 displays a preview window on the display 53 (e.g., step S46). Subsequent to step S46, in response to receipt of a user operation performed on the preview window via the input I/F 54, the terminal program 65 determines which icon has been selected (e.g., step S47).

As illustrated in FIG. 9B, the preview window includes a preview image 141, a [Settings] icon 142, a [Print] icon 143.

In the illustrative embodiment, for example, the preview image 141 shows how an image represented by selected data "Estimate.PDF" will be printed on a sheet. The [Settings] icon 142 corresponds to an instruction to specify one or more settings for a printing operation. The [Print] icon 143 corresponds to an instruction to execute a printing operation.

If the terminal program 65 determines that the [Print] icon 143 has been selected via the input I/F 54 (e.g., "PRINT" ICON in step S47), the terminal program 65 determines whether the selected data identified by the selected data ID is in PDF format (e.g., step S49). If the terminal program 65 determines that the selected data identified by the selected data ID (e.g., the selected data "Estimate.PDF") is in PDF format (e.g., YES in step S49), the terminal program 65 executes a data conversion process (e.g., step S50). If the terminal program 65 determines that the selected data identified by the selected data ID is not in PDF format (e.g., NO in step S49), the terminal program 65 skips the data conversion process (e.g., step S50). The data conversion process is for converting the format of the selected data from PDF format to JPEG format. Referring to FIG. 6A, the data conversion process will be described in detail.

[Data Conversion Process]

The terminal program 65 determines whether the selected data has a size of smaller than 50 MB (e.g., step S61). If the terminal program 65 determines that the selected data (e.g., the selected data "Estimate.PDF") has a size of smaller than 50 MB (YES in step S61), the terminal program 65 requests the conversion server to execute the conversion process on the selected data (e.g., the selected data "Estimate.PDF") (e.g., step S62). In the illustrative embodiment, more specifically, for example, the terminal program 65 transmits conversion request information including the selected data "Estimate.PDF" to the conversion server via the communication I/F 55. As a response to the conversion request information, the terminal program 65 receives the selected data "Estimate.PDF" whose format was converted into JPEG format, from the conversion server via the communication I/F 55. Processing executed in step S62 is an example of a conversion process.

Subsequent to step S62, the terminal program 65 increments the value indicating the total count of converting operation stored in the memory 62 by 1 (one) (e.g., step S63). Subsequent to step S63, the terminal program 65 determines whether the value indicating the current total count of converting operation indicates five, which is the threshold value (e.g., step S64). If the terminal program 65 determines the value indicating the current total count of converting operation indicates five (e.g., YES in step S64), the terminal program 65 determines that a trigger operation corresponding to the application ID "PDF conversion" has been accepted, and thus temporarily stores the application ID "PDF conversion" in the memory 62, as a target application ID. The fifth time user operation of selecting the data icon corresponding to the PDF data is another example of the trigger operation. Processing executed in step S64 is another example of the first determination process.

In response to the determination that the value indicating the current total count of converting operation indicates five (e.g., YES in step S64), the terminal program 65 executes the recommended application introduction process (e.g., step S65). In response to determining that the selected data "Estimate.PDF" has a size of 50 MB or larger (e.g., NO in step S61), the terminal program 65 skips processing of steps S62, S63, and S64 and executes the recommended application introduction process (e.g., step S65). If the terminal program 65 determines the value indicating the current total count of converting operation has not reached five (e.g., NO in step S64), the terminal program 65 ends the data conversion process.

Returning to the printing process of FIG. 5, the terminal program 65 transmits print instruction information to the currently selected device (e.g., the MFP 10B) via the communication I/F 55 (e.g., step S51). The print instruction information is an example of operation instruction information that instructs execution of an image processing operation identified by the operation specification information specified by the user. In the illustrative embodiment, the print instruction information includes the selected data "Estimate.PDF" which is one of the operation specification information. Processing executed in step S51 is an example of an operation instruction process.

In the illustrative embodiment, the device program 35 of the MFP 10B which is the selected device receives the print instruction information from the mobile terminal 50 via the commutation I/F 25. In response, the device program 35 causes the printer 11 to perform a printing operation in accordance with the received print instruction information. More specifically, for example, the printer 11 records an image represented by the selected data "Estimate.PDF" in JPEG format onto a sheet.

Subsequent to step S51, the terminal program 65 determines whether the third value "YES" is assigned to the installation flag stored in the memory 62 (e.g., step S52). If the terminal program 65 determines that the fourth value "NO" is assigned to the installation flag (e.g., NO in step S52), the terminal program 65 ends the printing process.

If the terminal program 65 determines that another (e.g., the data icon 131) of the data icons has been selected via the input I/F 54 on the data selection window of FIG. 9A (e.g., YES in step S45), the terminal program 65 temporarily stores a data ID (e.g., a data ID "Photo.JPEG") associated to the selected data icon (e.g., the data icon 131), as a selected data ID, in the memory 62. Subsequent to step S45, as illustrated in FIG. 10A, the terminal program 65 displays another preview window on the display 53 (e.g., step S46). The preview window of FIG. 10A has a similar configuration to the preview window of FIG. 9B except that the preview window of FIG. 10A includes a preview image 144 represented by the selected data "Photo.JPEG".

Figure 6B:
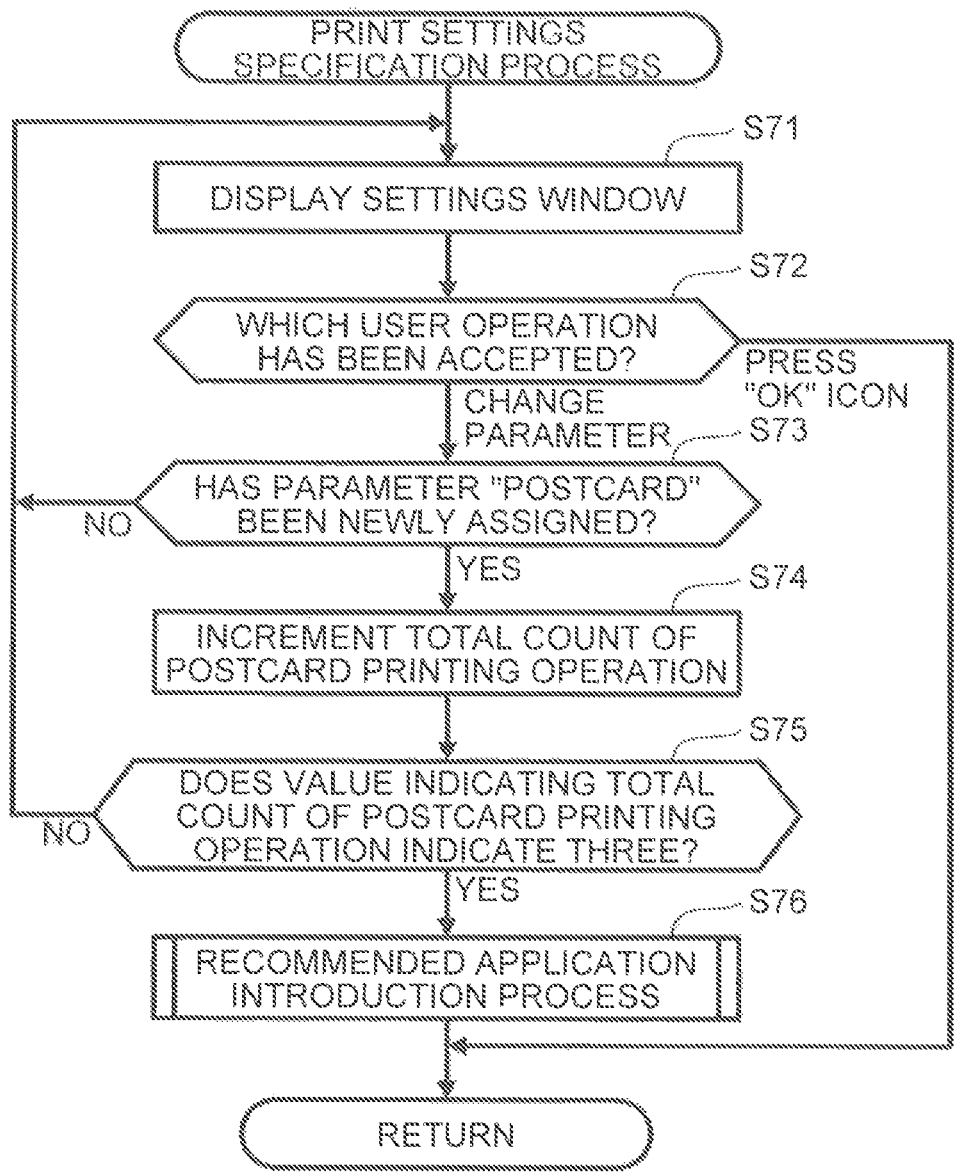
FIG. 6B is a flowchart of a print settings specification process in the illustrative embodiment according to one or more aspects of the disclosure.

If the terminal program 65 determines that the [Settings] icon 142 has been selected via the input I/F 54 (e.g., "SETTINGS" ICON in step S47), the terminal program 65 executes a print settings specification process (e.g., step S48). In the print settings specification process is for causing the user to specify one or more settings for a printing operation. Referring to FIG. 6B, the print settings specification process will be described in detail.

[Print Settings Specification Process]

Figure 10B:
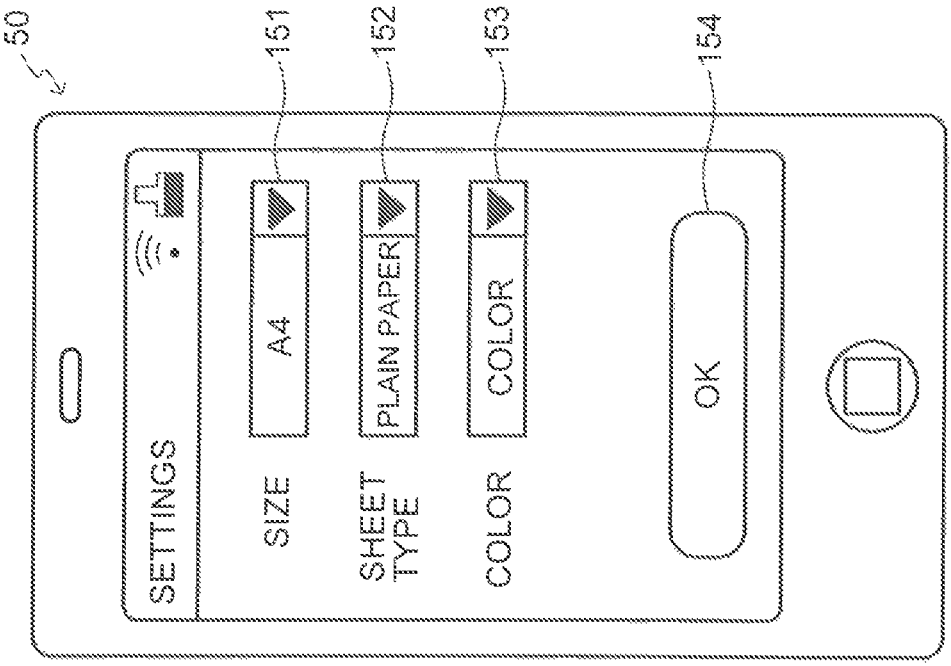
FIG. 10B illustrates another example window to be displayed on the display in the illustrative embodiment according to one or more aspects of the disclosure, wherein a settings window is displayed.
Figure 10A:
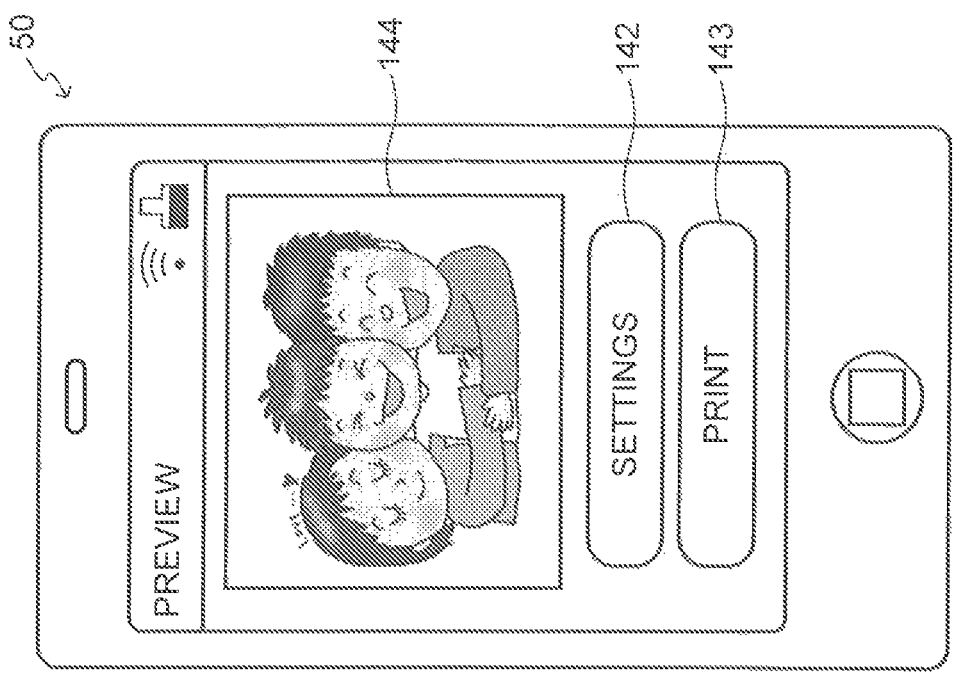
FIG. 10A illustrates another example window to be displayed on the display in the illustrative embodiment according to one or more aspects of the disclosure, wherein another preview window for selected data "Photo.JPEG" is displayed.

As illustrated in FIG. 10B, the terminal program 65 displays a settings window on the display 53 (e.g., step S71). The settings window includes dropdown menus 151, 152, and 153 and an [OK] icon 154. The dropdown menus 151, 152, and 153 correspond to the setting items "size, "sheet type", and "color", respectively, which are the settings for a printing operation. The [OK] icon 154 corresponds to an instruction to finalize the print settings. Subsequent to step S71, in response to receipt of a user operation performed on the settings window via the input I/F 54, the terminal program 65 determines which user operation has been accepted (e.g., step S72). Processing executed in step S72 is another example of the first accepting process.

Each of the dropdown menus 151, 152, and 153 has been assigned with one of the parameters. For example, the dropdown menu 151 shows the assigned parameter "A4", the dropdown menu 152 shows the assigned parameter "plain", and the dropdown menu 153 shows the assigned parameter "color". The assigned parameters of the dropdown menus 151, 152, and 153 are stored in the memory 62 as specified setting information.

The dropdown menu 151 corresponding to the setting item "size" includes a plurality of, for example, four parameters, e.g., "A4", "B5", "3R (equivalent to Japanese L)", and "postcard". The dropdown menu 152 corresponding to the setting item "sheet size" includes a plurality of, for example, two parameters, e.g., "plain" and "glossy". The dropdown menu 153 corresponding to the setting item "color" includes a plurality of, for example, two parameters, e.g., "color" and "monochrome". Each of the dropdown menus 151, 152, and 153 is another example of the candidate object. Each of the parameters included in each of the dropdown menus 151, 152, and 153 is another example of the candidate information.

If the terminal program 65 determines that a user operation for changing at least one of the parameters assigned to the dropdown menus 151, 152, and 153 is accepted via the input I/F 54 (e.g., CHANGE PARAMETER in step S72), the terminal program 65 changes the specified setting information stored in the memory 62 to a new one. In such a case, subsequent to step S72, the terminal program 65 determines whether the parameter "postcard" has been newly assigned to the setting item "size" (e.g., step S73). If the terminal program 65 determines that the parameter "postcard" has not been newly assigned to the setting item "size" (e.g., NO in step S73), the terminal program 65 displays the updated settings window including the dropdown menus 151, 152, and 153 with the one or more updated parameters, on the display 53 (e.g., step S71).

If the terminal program 65 determines that the parameter "postcard" has been newly assigned to the dropdown menu 151 (e.g., YES in step S73), the terminal program 65 increments the total count of postcard printing operation stored in the memory 62 by 1 (one) (e.g., step S74). Subsequent to step S74, the terminal program 65 determines whether the value indicating the current total count of postcard printing operation indicates three (e.g., step S75).

In response to the determination that the value indicating the current total count of postcard printing operation indicates three (e.g., YES in step S75), the terminal program 65 determines that a trigger operation corresponding to the application ID "postcard" has been accepted, and temporarily stores the application ID "postcard" in the memory 62, as a target application ID. The setting item "size" is an example of a particular item. The parameter "postcard" is an example of a particular parameter. The third time user operation of assigning the parameter "postcard" to the setting item "size" of the dropdown menu 151 is another example of the trigger operation. Processing executed in step S75 is another example of the first determination process. Subsequent to step S75, the terminal program 65 executes the recommended application introduction process (e.g., step S76).

If the terminal program 65 determines that the value indicating the current total count of postcard printing operation has not reached three (e.g., NO in step S75), the terminal program 65 displays, on the display 53, the settings window including the dropdown menu 151 with the parameter "postcard" assigned (e.g., step S71). If the terminal program 65 determines that the [OK] icon 154 has been selected on the settings window via the input I/F 54 (e.g., "OK" ICON in step S72), the terminal program 65 ends the print settings specification process.

Returning to the printing process of FIG. 5, the terminal program 65 executes step S46 and its subsequent steps. If the terminal program 65 determines that the selected data "Photo.JPEG" is not in PDF format (e.g., NO in step S49), the terminal program 65 transmits print instruction information to the currently selected device (e.g., the MFP 10B) via the communication I/F 55 (e.g., step S51). In such a case, the print instruction information includes the selected data (e.g., the selected data "Photo.JPEG"), and the specified setting information specified in the print settings specification process, as operation specification information. Processing in the other steps are the same or similar to processing in respective corresponding steps.

Figure 6C:
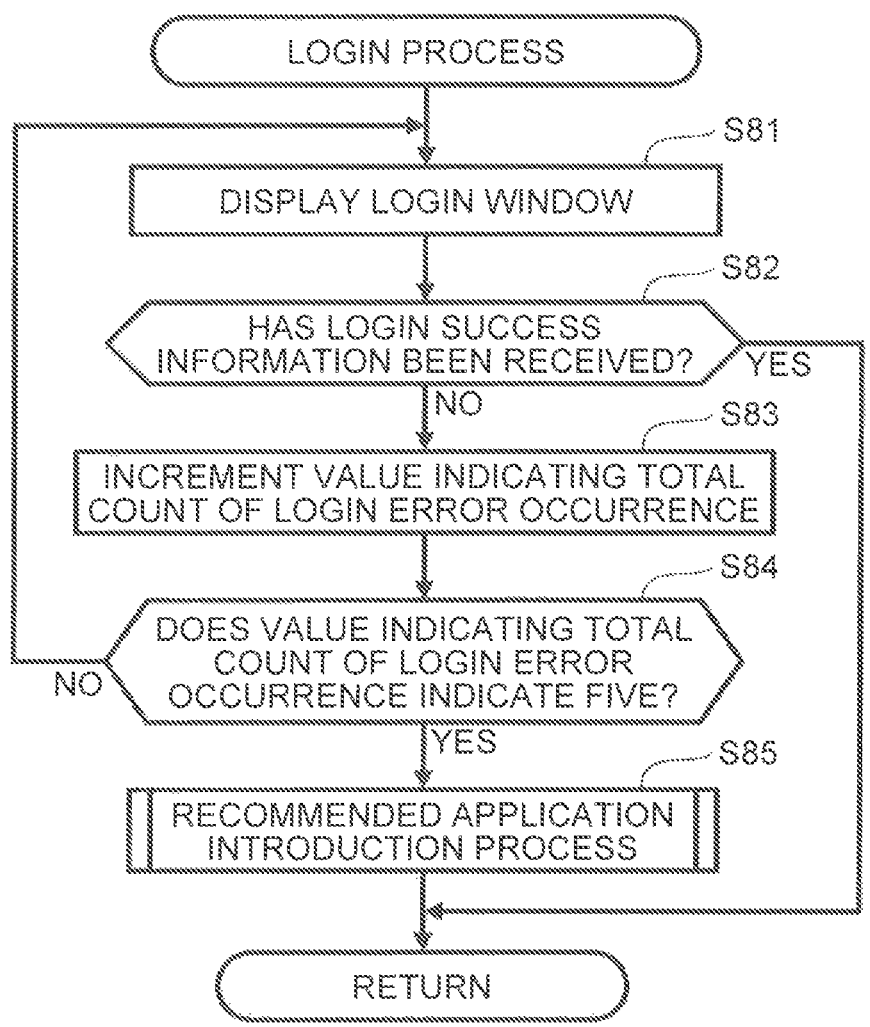
FIG. 6C is a flowchart of a login process in the illustrative embodiment according to one or more aspects of the disclosure.

If the terminal program 65 determines that the data source icon 123 has been selected on the data source selection window (refer to FIG. 8B) via the input I/F 54 (e.g., YES in step S42), the terminal program 65 temporarily stores the data source ID indicating the mail server, as a selected data source ID, in the memory 62. The login process is for attempting a login to the mail server using the account information (e.g., the account name and password) entered by the user. Referring to FIG. 6C, the login process will be described in detail.

[Login Process]

Figure 11B:
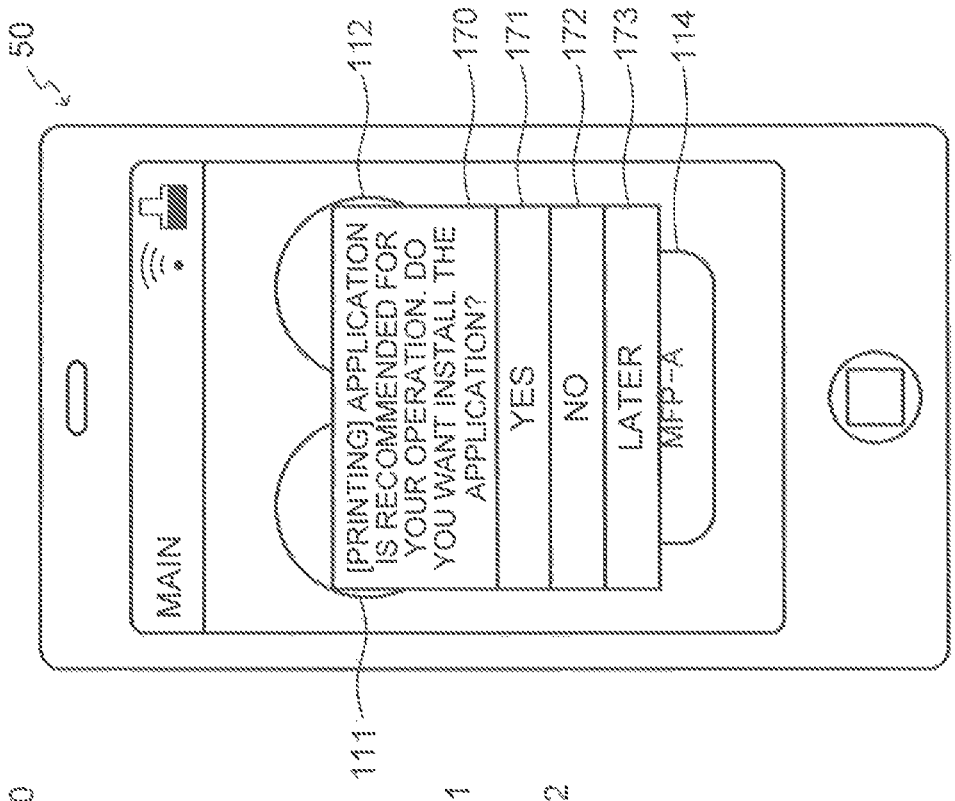
FIG. 11B illustrates another example window to be displayed on the display in the illustrative embodiment according to one or more aspects of the disclosure, wherein a recommended application introduction window is displayed.
Figure 11A:
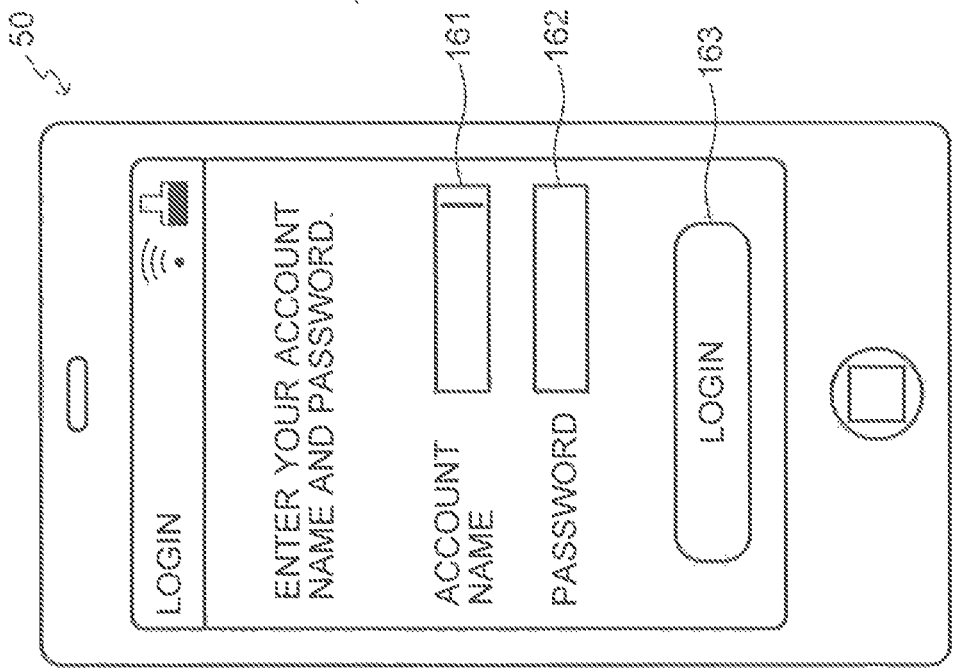
FIG. 11A illustrates another example window to be displayed on the display in the illustrative embodiment according to one or more aspects of the disclosure, wherein a login window is displayed.

The terminal program 65 displays a login window (refer to FIG. 11A) on the display 53 (e.g., step S81). The login window includes a text-entry field 161 for enabling the user to enter an account name, a text-entry field 162 for enabling the user to enter a password, and a [Login] icon 163. The terminal program 65 accepts an user operation performed on the login window via the input I/F 54.

In response to entry of the account name and password through a software keyboard (not illustrated), the terminal program 65 displays the entered text strings in the respective text-entry fields 161 and 162. In response to selection of the [Login] icon 163 via the input I/F 54, the terminal program 65 transmits login request information including the entered account information, to the mail server via the communication I/F 55.

The terminal program 65 then receives login success information or login failure information from the mail server via the communication I/F 55 in reply to the login request information. The login success information indicates that the correct account information was entered. The login failure information indicates that the wrong account information was entered. If the terminal program 65 determined that the login failure information has been received from the mail server (e.g., NO in step S82), the terminal program 65 determines that the login attempt failed, and increments the total count of login error occurrence stored in the memory 62 by 1 (one) (e.g., step S83). Receiving the login failure information is an example of failing acquisition of selected data from the mail server.

Subsequent to step S83, the terminal program 65 determines whether the value indicating the total count of login error occurrence indicates five (e.g., step S84). If the terminal program 65 determines the value indicating the current total count of login error occurrence has not reached five (e.g., NO in step S84), the terminal program 65 executes step S81 and its subsequent steps. If the terminal program 65 determines the value indicating the current total count of login error occurrence indicates five (e.g., YES in step S84), the terminal program 65 determines that a trigger operation corresponding to the application ID "email printing" has been accepted, and thus temporarily stores the application ID "email printing" in the memory 62, as a target application ID. The fifth time user operation of entering the wrong account information is another example of the trigger operation. Processing executed in step S84 is another example of the first determination process. In response to the determination that the value indicating the current total count of login error occurrence indicates five (e.g., YES in step S84), the terminal program 65 executes the recommended application introduction process (e.g., step S85).

If the terminal program 65 determines that the login success information has been received from the mail server (e.g., YES in step S82), the terminal program 65 determines that the login attempt has succeed and ends the login process. Returning to the printing process of FIG. 5, the terminal program 65 displays, on the display 53, the data selection window including one or more data icons corresponding to one or more emails, respectively, stored in the mail server (e.g., step S44). Processing in step S45 and its subsequent steps are the same or similar to processing in respective corresponding steps.

[Recommended Application Introduction Process]

Referring to FIG. 7, the recommended application introduction process will be described. The terminal program 65 determines whether the external program 66 identified by the target application ID temporarily stored in the memory 62 has been installed on the mobile terminal 50 (e.g., step S91). That is, the terminal program 65 determines the current value of the installation status information for the target application ID. Processing executed in step S91 is an example of a second determination process.

If the terminal program 65 determines that the parameter "Not Installed" is assigned to the install status information for the target application ID (e.g., the target application ID "printing") (e.g., NO in step S91), the terminal program 65 displays a recommended application introduction window 170 (refer to FIG. 11B) on the display 53. The recommended application introduction window 170 includes a message, an [Yes] icon 171, a [No] icon 172, and a [Later] icon 173. In the illustrative embodiment, for example, the message may be such that "A [printing] application is recommended for your operation. Do you want to install the application?"

Subsequent to step S96, in response to receipt of a user operation performed on the recommended application introduction window 170 via the input I/F 54, the terminal program 65 determines which icon has been selected (e.g., step S97). Selecting the [Yes] icon 171 is an example of a third input. Selecting the [No] icon 172 is an example of a fourth input. Selecting the [Later] icon 173 is an example of a fifth input. Processing executed in step S97 is an example of a third accepting process.

If the terminal program 65 determines that the [Yes] icon 171 has been selected on the recommended application introduction window 170 via the input I/F 54 (e.g., "YES" ICON in step S97), the terminal program 65 stores, in a specific area, the operation specification information that has been temporarily stored in the memory 62 (e.g., step S98). The specific area is part of the memory 62 and may be accessed by the target application when the application starts up. That is, the terminal program 65 passes the operation specification information to the target application via the specific area. Subsequent to step S98, the terminal program 65 installs the target application on the mobile terminal 50 (e.g., step S99). More specifically, for example, the terminal program 65 starts up the installer 67 by assigning the target application ID "printing" as an argument. Processing executed in step S99 is an example of an installation process.

Thereafter, the installer 67 downloads an execution file of the target application identified by the target application ID "printing", and stores the downloaded execution file in a predetermined area of the memory 62. Then, the installer 67 assigns the parameter "Installed" to the installation status information for the target application ID "printing".

After that, the OS 64 ends the terminal program 65 and the installer 67, and displays the menu window on the display 53. The menu window now further includes an icon corresponding to the printing application newly installed on the mobile terminal 50. In a case where the icon corresponding to the printing application is selected via the input I/F 54, the OS 64 starts up and executes the printing application in the foreground.

The printing application reads the operation specification information stored in the specific area from the memory 62, and executes processing using the read operation specification information. The printing application enables the user to specify data and setting information through the input I/F 54. The printing application causes the selected device, which is identified by the selected device information stored in the specific area, to perform a printing operation using the selected data, in accordance with the print settings specified by the specified setting information.

In step S97, if the terminal program 65 determines that the [Later] icon 173 has been selected on the recommended application introduction window 170 via the input I/F 54 (e.g., "LATER" ICON in step S97), the terminal program 65 assigns the third value "YES" to the installation flag (e.g., step S100) of the target application and ends the recommended application introduction process. If the terminal program 65 determines that the [No] icon 172 has been selected on the recommended application introduction window 170 via the input I/F 54 (e.g., "NO" ICON in step S97), the terminal program 65 ends the recommended application introduction process.

After ending the recommended application introduction process, the routine returns to the routine that called the recommended application introduction process (e.g., steps S18, S65, S76, or S85) and the terminal program 65 executes its subsequent steps. Subsequent to step S51, the terminal program 65 determines whether the third value "YES" is assigned to the installation flag (e.g., step S52). If the terminal program 65 determines that the third value "YES" is assigned to the installation flag (e.g., YES in step S52), the terminal program 65 installs the target application (e.g., step S53). Processing executed in step S53 is the same or similar to processing executed in step S99.

In step S91 of the recommended application introduction process of FIG. 7, if the terminal program 65 determines that the parameter "Installed" is assigned to the install status information for the target application ID (e.g., the target application ID "postcard") (e.g., YES in step S91), the terminal program 65 displays the recommended application introduction window 170 (e.g., step S92). In such a case, in step S92, the recommended application introduction window 170 includes a different message from the message included in the recommended application introduction window 170 of step S96 of FIG. 11B. For example, the message may be such that "The [postcard maker application] is recommended for your operation. Do you want to use the application?". Further, the recommended application introduction window 170 displayed in step S92 does not include the [Later] icon 173. Nevertheless, the recommended application introduction window 170 displayed in step S92 has the same or similar configuration in the other points to the recommended application introduction window 170 displayed in step S96 of FIG. 11B. Subsequent to step S92, in response to receipt of a user operation performed on the recommended application introduction window 170 via the input I/F 54, the terminal program 65 determines which icon has been selected (e.g., step S93). Selecting the [Yes] icon 171 is an example of a first input. Selecting the [No] icon 172 is an example of a second input. Processing executed in step S93 is an example of a second accepting process.

If the terminal program 65 determines that the [Yes] icon 171 has been selected on the recommended application introduction window 170 via the input I/F 54 (e.g., "YES" ICON in step S93), the terminal program 65 stores, in the specific area, the operation specification information that has been temporarily stored in the memory 62 (e.g., step S94). Subsequent to step S94, the terminal program 65 starts up the target application (e.g., step S95). More specifically, for example, in the illustrative embodiment, the terminal program 65 executes the startup API by assigning the target application ID "postcard" as an argument. Processing executed in step S95 is an example of a first startup process. Thus, while ending the terminal program 65, the OS 64 starts up and executes the postcard maker application in the foreground.

The postcard maker application reads the operation specification information from the specific area of the memory 62, and executes processing using the read operation specification information. The postcard maker application enables the user to select a template image through the input I/F 54. The postcard maker application superimposes the photo represented by the photo data identified by the selected data ID "Photo.JPEG" stored in the specific area, over the selected template image. Then, the postcard maker application causes the selected device identified by the selected device information stored in the specific area, to perform a printing operation for recording the superimposed image of the photo and the template image onto a communication side of a postcard.

In step S93 of the recommended application introduction process of FIG. 7, if the terminal program 65 determines that the [No] icon 172 has been selected on the recommended application introduction window via the input I/F 54 (e.g., "NO" ICON in step S93), the terminal program 65 ends the recommended application introduction process. After ending the recommended application introduction process, the routine returns to the routine that called the recommended application introduction process (e.g., steps S18, S65, S76, or S85) and the terminal program 65 executes its subsequent steps. In a case where either of an external program 66 identified by the target application ID "PDF conversion" and an external program 66 identified by the target application ID "email printing" is recommended by the terminal program 65, the same or similar processing is to be executed as described above.

In step S14 of the main process of FIG. 4, if the terminal program 65 determines that an SC icon (e.g., the SC icon 113) has been selected on the main window (refer to FIG. 8A) via the input I/F 54 (e.g., "SC" ICON in step S14), the terminal program 65 starts up the application program associated to the selected SC icon (e.g., the postcard maker application associated to the SC icon 113). More specifically, for example, in the illustrative embodiment, the terminal program 65 executes the startup API by assigning the application ID "postcard" associated to the SC icon 113 as an argument. Thus, the OS 64 ends the terminal program 65, and starts up and executes the postcard maker application in the foreground. Processing executed in step S14 for accepting selection of the SC icon 113 is an example of a fourth acceptance process. Processing executed in step S20 is an example of a second startup process.

[Effects Achieved by Illustrative Embodiment]

According to the illustrative embodiment, in response to receipt of a user's trigger operation for specifying operation specification information, the terminal program 65 starts up an external program 66 corresponding to the trigger operation. This may therefore enable the suitable external program 66 to substitute for the terminal program 65 to execute an operation that the user intends to implement through the terminal program 65.

In one example, the printing application dedicated to printing operation may enable the user to specify more detailed settings than the terminal program 65 that supports a plurality of image processing operations. In such a case, if the terminal program 65 causes an MFP 10 to perform a printing operation frequently, it may be preferable that, in response to receipt of a user's trigger operation, the terminal program 65 starts up the printing application. In the illustrative embodiment, the description has been made by taking the printing application as an example. Nevertheless, in other embodiments, for example, in response to determination that the total count of selecting the operation icon 112 associated with the operation ID "scan" has reached a threshold, the terminal program 65 may start up a scanning application that is configured to only instruct an MFP 10 to perform a scanning operation.

In another example, the postcard maker application that specializes in a printing operation in accordance with the print settings in which the parameter "postcard" is assigned to the setting item "size" (hereinafter, referred to as the "particular operation") may enable the user to assign more detailed settings than the terminal program 65 that supports various operations as well as the particular operation. In such a case, if the terminal program 65 causes an MFP 10 to perform the particular operation frequently, it may be preferable that, in response to receipt of a user's trigger operation, the terminal program 65 starts up the postcard maker application specializing in the particular operation.

In still another example, prior to causing the MFP 10 to execute an image processing operation, the terminal program 65 may need to communicate with a server on the Internet. Nevertheless, various errors may occur during the communication and various limitations may be imposed on such communication. Therefore, instead of the terminal program 65 communicates with the server on the Internet by itself, it may be preferable that the terminal program 65 starts up the email printing application that specializes in communication with the mail server or the PDF conversion application that substitutes the function of the conversion server. In the illustrative embodiment, in the login process (refer to FIG. 6C), a login to the mail server is attempted. Nevertheless, in other embodiments, for example, in the login process (refer to FIG. 6C), a login to a storage server (not illustrated) on the Internet may be attempted.

According to the illustrative embodiment, the terminal program 65 passes the operation specification information to the external program 66 prior to starting up the external program 66, thereby eliminating specification of the operation specification information after the external program 66 is started up. This may thus reduce the number of steps required in the user operation. In other embodiments, for example, the operation specification information to be passed may differ from each other depending on external programs 66. In other embodiments, for example, the external program 66 may execute processing using some information included in the acquired operation specification information. In other embodiments, for example, passing of the operation specification information to the external program 66 may be implemented by, for example, an intent function provided by the OS 64.

According to the illustrative embodiment, the user may be enabled to select a desired operation from the multiple options on the recommended application introduction window 170. The operation options may include, for example, causing the terminal program 65 to implement a desired process, causing an external program 66 corresponding to a trigger operation to substitute for the terminal program 65, and installing a target external program 66 subsequent to execution of step S51. This may therefore enable execution of a desired process in accordance with a user's intention.

According to the illustrative embodiment, the main window includes one or more SC icons 113 each corresponding to a respective external program 66 whose SC flag is assigned with the first value "ON". This may therefore enable the user to start up a desired one of the one or more external programs 66 that have been installed through the terminal program 65, by the user's intention. Nevertheless, in other embodiments, for example, another window, such as the device selection window, the data source selection window, the data selection window, the preview window, the settings window, or the login window, may include one or more such SC icons. That is, processing executed in each of steps S31, S41, S44, S46, S71, and S81 is another example of the display process.

In the illustrative embodiment, each processing executed by the controller is implemented by execution of various programs stored in the memory 31 by the CPU 31 in the MFP and by execution of various programs stored in the memory 62 by the CPU 61 in the mobile terminal 50. Nevertheless, the configuration of the controller is not limited to the specific example. Part or entire configuration of the controller may be implemented by hardware, for example, a logical circuit.

In other embodiments, for example, the one or more aspects of the disclosure may be implemented by a program that causes the mobile terminal 50 and one of the MFPs 10 to execute processing. The program may be recorded on and supplied by a non-transitory recording medium. The non-transitory recording medium may include an memory of a server that may communicate with the MFP 10 and the mobile terminal 50 via the communication network 101, as well as CD-ROMs and DVD-ROMs. The program stored in the memory of the server may be distributed via the communication network 101, e.g., the Internet, as information or a signal representing the program.

What is claimed is:

1. A non-transitory computer-readable medium storing computer-readable instructions executable by a processor of a terminal apparatus comprising a memory, an input interface, and a communication interface, the terminal apparatus being communicably connectable to an image processing apparatus via the communication interface, the memory storing a plurality of sets of an external program and operation information associated with each other, the external program causing the image processing apparatus to perform an image processing operation, and the operation information indicating a trigger operation which is one of user operations acceptable via the input interface and triggers start-up of one of the external programs,
wherein the instructions, when executed by the processor, cause the terminal apparatus to execute:
in a first accepting process, accepting, via the input interface, a user operation specifying operation specification information that defines details of the image processing operation that is to be performed by the image processing apparatus in response to an instruction provided by the terminal apparatus;
in a first determination process, determining whether the user operation accepted in the first accepting process is the trigger operation;
in a case where it is determined that, in the first determination process, the user operation accepted in the first accepting process is not the trigger operation, in an operation instruction process, causing the image processing apparatus to perform the image processing operation whose details are defined by the operation specification information; and
in a case where it is determined that, in the first determination process, the user operation accepted in the first accepting process is the trigger operation, in a first startup process, starting up the external program associated with the operation information indicating the trigger operation.

2. The non-transitory computer readable storage medium according to claim 1,
wherein the instructions, when executed by the processor, further cause the terminal apparatus to execute:
instructing the image processing apparatus to perform one of a first operation and a second operation;
in the first accepting process, accepting a user operation for selecting one of the first operation and the second operation as a particular operation;
in the operation instruction process, causing the image processing apparatus to perform the particular operation selected in the first accepting process;
in a case where it is determined that, in the first determination process, a total count of the user operation for selecting the first operation as the particular operation has reached a threshold,
determining that the user operation accepted in the first accepting process is the trigger operation; and
in the first startup process, starting up the external program that only instructs the image processing apparatus to perform the first operation.

3. The non-transitory computer readable storage medium according to claim 1,
wherein the instructions, when executed by the processor, further cause the terminal apparatus to execute:
in the first accepting process, accepting a user operation for assigning settings, the settings representing parameters for each of a plurality of setting items;
in the operation instruction process, causing the image processing apparatus to perform the image processing operation in accordance with the settings specified by parameters assigned in the first accepting process;
in a case where it is determined that, in the first determination process, a total count of the user operation for specifying a particular parameter of a particular setting item included in the settings has reached a threshold,
determining that the user operation accepted in the first accepting process is the trigger operation; and
in the first startup process, starting up the external program that specializes in performance of the image processing operation in accordance with the settings including the particular parameter.

4. The non-transitory computer readable storage medium according to claim 1,
wherein the instructions, when executed by the processor, further cause the terminal apparatus to execute:

in the first accepting process, accepting a user operation for selecting a data source of data to be used in the image processing operation;

in the operation instruction process, causing the image processing apparatus to perform the image processing operation using the selected data acquired from the data source selected in the first accepting process;

in a case where it is determined that, in the first determination process, a total count of failed acquisition of the selected data from the data source on the Internet has reached a threshold, determining that the user operation accepted in the first accepting process is the trigger operation; and in the first startup process, starting up the external program that specializes in acquisition of the selected data from the data source.

5. The non-transitory computer readable storage medium according to claim 1, wherein the instructions, when executed by the processor, further cause the terminal apparatus to execute:

in the first accepting process, accepting a user operation for selecting data to be used in the image processing operation;

in a case where it is determined that, in the first determination process, the data having a first format and a size of a threshold or larger has been selected, determining that the user operation accepted in the first accepting process is the trigger operation; and in the first startup process, starting up the external program that converts the selected data from the first format to a second format that is different from the first format;

in a case where it is determined that, in the first determination process, the user operation accepted in the first accepting process is not the trigger operation, requesting a server on the Internet to perform a conversion process for converting the selected data from the first format to the second format; and in the operation instruction process, causing the image processing apparatus to perform the image processing operation using the selected data converted to the second format in the conversion process.

6. The non-transitory computer readable storage medium according to claim 1, wherein the instructions, when executed by the processor, further cause the terminal apparatus to execute:

in the first startup process, passing the operation specification information specified in the first accepting process to the external program before starting up the external program.

7. The non-transitory computer readable storage medium according to claim 1, wherein the instructions, when executed by the processor, further cause the terminal apparatus to execute:

in a case where it is determined that, in the first determination process, the user operation accepted in the first accepting process is the trigger operation, in a second determination process, determining whether the external program associated with the operation information indicating the trigger operation has been installed on the terminal apparatus;

in a case where it is determined that, in the second determination process, the external program associated with the operation information indicating the trigger operation has been installed on the terminal apparatus, executing the first startup process; and in a case where it is determined that, in the second determination process, the external program associated with the operation information indicating the trigger operation has not been installed on the terminal apparatus, executing an installation process for installing the external program associated with the operation information indicating the trigger operation on the terminal apparatus.

8. The non-transitory computer readable storage medium according to claim 7, wherein the instructions, when executed by the processor, further cause the terminal apparatus to execute:

in a case where it is determined that, in the second determination process, the external program associated with the operation information indicating the trigger operation has been installed on the terminal apparatus, in a second accepting process, accepting one of a first input and a second input via the input interface;

in a case where it is determined that, in the second determination process, the first input has been accepted, executing the startup process; and in a case where it is determined that, in the second determination process, the second input has been accepted, executing the operation instruction process.

9. The non-transitory computer readable storage medium according to claim 7, wherein the instructions, when executed by the processor, further cause the terminal apparatus to execute:

in a case where it is determined that, in the second determination process, the external program associated with the operation information indicating the trigger operation has not been installed on the terminal apparatus, in a third accepting process, accepting one of a third input, a fourth input, or a fifth input via the input interface;

in a case where it is determined that, in the third determination process, the third input has been accepted, executing the installation process;

in a case where it is determined that, in the third determination process, the fourth input has been accepted, executing the operation instruction process;

in a case where it is determined that, in the third determination process, the fifth input has been accepted, executing the operation instruction process; and subsequent to execution of the operation instruction process, executing the installation process.

10. The non-transitory computer readable storage medium according to claim 7, wherein the terminal apparatus further includes a display, and wherein the instructions, when executed by the processor, further cause the terminal apparatus to execute:

in a display process, displaying a plurality of candidate objects and one or more shortcut objects on the display, each of the plurality of candidate objects being associated with candidate information which is a candidate for the operation specification information, the one or more shortcut objects being associated with the respective external programs installed on the terminal apparatus in the installation process;

in the first accepting process, accepting a user operation for selecting one of the plurality of the candidate objects, as a user operation for specifying the candidate information associated with the selected candidate object as the operation specification information;

in a fourth accepting process, accepting, via the input interface, a user operation for selecting one of the one or more shortcut objects; and in a second startup process, starting up the external program corresponding to the shortcut object selected in the fourth accepting process.

11. A terminal apparatus communicably connectable to an image processing apparatus comprising:

a memory, storing a plurality of sets of an external program and operation information associated with each other, the external program including instructions that cause the image processing apparatus to perform an image processing operation, and the operation information indicating a trigger operation which is one of user operations acceptable and triggers start-up of one of the external programs;

an input interface;

a communication interface; and a controller operatively connected to the communication interface and the memory, the controller configured to execute instructions from the memory that, when executed, cause the terminal apparatus to perform:

accepting, via the input interface, a user operation for specifying operation specification information that defines details of the image processing operation that is to be performed by the image processing apparatus in response to an instruction provided by the terminal apparatus;

determining whether the user operation is the trigger operation;

in a case where it is determined that the user operation is not the trigger operation, causing the image processing apparatus to perform the image processing operation whose details are defined by the operation specification information; and in a case where it is determined that the user operation is the trigger operation starting up the external program associated with the operation information indicating the trigger operation.

12. A method comprising:

accepting, via an input interface of an terminal apparatus, a user operation for specifying operation specification information that defines details of an image processing operation that is to be performed by an image processing apparatus in response to an instruction provided by the terminal apparatus;

determining whether the user operation is a trigger operation;

in a case where it is determined that the user operation is not the trigger operation, causing the image processing apparatus to perform the image processing operation whose details are defined by the operation specification information; and in a case where it is determined that the user operation is the trigger operation starting up the external program associated with the operation information indicating the trigger operation.

* * * * *